US006818117B2

(12) United States Patent
Ferguson et al.

(10) Patent No.: US 6,818,117 B2
(45) Date of Patent: Nov. 16, 2004

(54) ELECTROCHEMICALLY DIRECTED SELF-ASSEMBLY OF MONOLAYERS ON METAL

(75) Inventors: Gregory S. Ferguson, Bethlehem, PA (US); Chen-Chan Hseuh, Somerset, NJ (US); Mong-Tung Lee, Pacifica, CA (US); Michael S. Freund, Sierra Madre, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 10/094,759

(22) Filed: Mar. 7, 2002

(65) Prior Publication Data

US 2003/0024823 A1 Feb. 6, 2003

Related U.S. Application Data

(60) Provisional application No. 60/274,480, filed on Mar. 9, 2001.

(51) Int. Cl.[7] .................................................. C25D 9/00
(52) U.S. Cl. ...................................... 205/316; 205/317
(58) Field of Search ................................. 205/316, 317

(56) References Cited

U.S. PATENT DOCUMENTS 5,827,417 A * 10/1998 Porter et al. ................ 204/489

OTHER PUBLICATIONS

Whitesides, G. M.; Ferguson, G. S., Allara, D.; Scherson, D.; Speaker, L.; Ulman, A., Organized Molecular Assemblies, Rev. Surf. Chem. 3:49 (1993).
Database Compendex, Nann, T., et al., Deposition of hydroquinone–thiosulfate on gold by means of anodic oxidation, database accession No. E2001296588885 XP–002209432, Abstract, J. Electroanal. Chem. (2001) No month.
Abe, K.; Takiguchi, H.; Tamada, K., Dynamic contact angle measurement of Au(111)–Thiol self–assembled monolayers by the Wilhelmy plate method, Langmuir 16:2394–2397 (2000) No month.
Abbott, S.; Ralston, J.; Reynolds, G.; Hayes, R., Reversible wettability of photoresponsive pyrimidine–coated surfaces, Langmuir 15:8923–8928 (1999) No month.
Affleck, J. G.; Dougherty, G., The preparation and relative reactivities of many–membered cyclic disulfides, J. Org. Chem. 15:865–868 (1950) No month.
Alexander, P. W.; Rechnitz, G. A., Enzyme inhibition assays with an amperometric glucose biosensor based on a thiolate self–assembled monolayer, Electroanalysis 12:343–350 (2000) No month.
Aoki, K.; Kakiuchi, T., Probability theory of desorption kinetics of self–assembled alkanethiols stabilized with pair interaction, J. Electroanal. Chem. 452:187–192 (1998) No month.
Ardizzone, S.; Bianchi, C. L., Acidity, sulphur coverage and XPS analyses of $ZrO_2$–$SO_4$ powders by different procedures, Appl. Surf. Sci. 152:63–69 (1999) No month.
Arnold, S.; Feng, Z. Q.; Kakiuchi, T.; Knoll, W.; Niki, K., Investigation of the electrode reaction of cytochrome c through mixed self–assembled monolayers of alkanethiols on gold(111) surfaces, J. Electroanal. Chem. 438:91–97 (1997) No month.
Audi, A. A.; Sherwood, P. M. A., X–ray photoelectron spectroscopic studies of sulfates and bisulfates interpreted by $X\alpha$ and band structure calculations, Surf. Interface Anal. 29:265–275 (2000) No month.
Bain C. D.; Troughton, E. B.; Tao, Y.–T.; Evall, J.; Whitesides, G. M.; Nuzzo, R. G., Formation of monolayer films by the spontaneous assembly of organic thiols from solution onto gold, J. Am. Chem. Soc. 111:321–335 (1989) No month.
Bain, C. D.; Whitesides, G. M., Formation of monolayers by the coadsorption of thiols on gold: variation in the length of the alkyl chain, J. Am. Chem. Soc. 111:7164–7175 (1989) No month.
Bar, G.; Rubin, S.; Parikh, A. N.; Swanson, B. I.; Zawodzinski, T. A., Whangbo, M. H., Scanning force microscopy study of patterned monolayers of alkanethiols in gold. Importance of tip–sample contact area in interpreting force modulation and friction force microscopy images, Langmuir 13:373–377 (1997) No month.
Bar, G.; Rubin, S.; Taylor, T. N.; Swanson, B.I.; Zawodzinski, T. A.; Chow, J. T.; Ferraris, J. P., Patterned self–assembled monolayers of ferrocene and methyl terminated alkanethiols on gold: a combined electrochemical, scanning probe microscopy, and surface science study, J. Vac. Sci. Technol., A 14:1794–1800 (1996) No month.
Baran, J.; Ilczyszyn, M. M.; Marchewka, M. K.; Ratajczak, H., Vibrational studies of different modifications of the sodium hydrogen sulphate crystals, Spectrosc. Lett. 32:83–102 (1999) No month.
Bell, C. M.; Yang, H. C.; Mallouk, T. E., Materials chemistry of organic monolayer and multilayer thin films, Adv. Chem. Ser. 245:211–230 (1995) No month.
Berlin, A.; Zotti, G., Self–assembly of mono– and multilayers of polyconjugated conducting polymers, Macromol. Rapid Commun. 21:301–318 (2000) No month.
Bruening, M. L.; Zhou, Y.; Aguilar, G.; Agee, R.; Bergbreiter, D. E.; Crooks, R. M., Synthesis and characterization of surface–grafted, hyperbranched polymer films containing fluorescent, hydrophibic, ion–binding, biocompatible, and electroactive groups, Langmuir 13:770–778 (1997) No month.

(List continued on next page.)

Primary Examiner—Wesley A. Nicolas
(74) Attorney, Agent, or Firm—Knobbe Martens Olson & Bear LLP

(57) ABSTRACT

Disclosed is a method of preparing self-assembled monolayers on a metal comprising electrolyzing a thiosulfate compound in a solvent, where the electricity for the electrolysis is applied at a voltage for a period of time.

29 Claims, 16 Drawing Sheets

OTHER PUBLICATIONS

Byloos, M.; Al-Maznai, H.; Morin, M., Formation of a self-assembled monolayer via the electrospreading of physisorbed micelles of thiolates, J. Phys. Chem. B. 103:6554–6561 (1999) No month.

Callow, M. E.; Callow, J. A.; Ista, L.K.; Coleman, S. E.; Nolasco, A. C.; Lopez, G. P., Use of self-assembled monolayers of different wettabilities to study surface selection and primary adhesion processes of green algal (enteromorpha) zoospores, Appl. Environ. Microbiol. 66:3249–3254 (2000) No month.

Chailapakul, O.; Sun, L.; Xu, C.; Crooks, R. M., Interactions between organized, surface–confined monolayers and vapor–phase probe molecules. 7. Comparison of self-assembling n–alkanethiol monolayers deposited on gold from liquid and vapor phases, J. Am. Chem. Soc. 115:12459–12467 (1993) No month.

Chan, K. C.; Kim, T.; Schoer, J. K.; Crooks, R. M., Polymeric self-assembled monolayers. 3. Pattern transfer by use of photolithography, electrochemical methods, and an ultrathin, self-assembled diacetylenic resist, J. Am. Chem. Soc. 117:5875–5876 (1995) No month.

Chen, C. S.; Mrksich, M.; Huang, S.; Whitesides, George M.; Ingber, D. E., Micropatterned surfaces for conrol of cell shape, position, and function, Biotechnol. Prog. 14:356–363 (1998) No month.

Chen, C. S.; Ostuni, E.; Whitesides, G. M.; Ingber, D. E., Using Self–Assembled Monolayers to Pattern ECM Proteins and Cells on Substrates, Methods Mol. Biol. 139:209–219 (2000) No month.

Cheng, Y.; Corn. R. M., Ultrathin polypeptide multilayer films for the fabrication of model liquid/liquid electrochemical interfaces, J. Phys. Chem. B. 103:8726–8731 (1999) No month.

Clark, S. L.; Montague, M.; Hammond, P. T., Selective deposition in multilayer assembly: SAMs as molecular templates, Supramol. Sci. 4:141–146 (1997) No month.

Clear, Susannah C.; Nealey, Paul F., Chemical force microscopy study of adhesion and friction between surfaces functionalized with self-assembled monolayers and immersed in solvents, J. Colloid Interface Sci. 213:238–250 (1999) No month.

Collinson, M.; Bowden, E. F.; Tarlov, M. J., Voltammetry of covalently immobilized cytochrome c on self-assembled monolayer electrodes, Langmuir 8:1247–1250 (1992) No month.

Cotton, C.; Glidle, A.; Beamson, G.; Cooper, J. M., Dynamics of the formation of mixed alkanethiol monolayers: applications in structuring biointerfacial arrangements, Langmuir 14:5139–5146 (1998).

Crooks, R. M.; Ricco, A. J., New organic materials suitable for use in chemical sensor arrays, Acc. Chem. Res. 31:219–227 (1998) No month.

Czerwinski, A.; Orzeszko, A.; Kazimierczuk, Z.; Marassi, R.; Zamponi, S., The electrochemical behavior of bunte salts, Anal. Lett. 30:2391–2408 (1997) No month.

Davies, J. E. D.; Sandford, W. F., Solid–state vibrational spectroscopy. Part IV. A vibrational and differential scanning calorimetry study of the polymorphism of sodium and potassium sulphates, J. Chem. Soc., Dalton Trans. 19:19121915 (1975) No month.

Davis, F.; Stirling, C. J. M., Spontaneous multilayering of calix–4–resorcinarenes, J. Am. Chem. Soc. 117:10385–10386 (1995) No month.

Deng, W.; Fujita, D.; Yang, L.; Nejo, H.; Bai, C., Multilayer formation of copper ions ($Cu^{2+}$) deposited onto self-assembled monolayers of alkanedithiols on Au (111) surfaces, Jpn. J. Appl. Phys. Part 2, 39:L751–L754 (2000) No month.

Distler, H., The Chemistry of Bunte Salts, Angew. Chem. Internat. Eng. 6:544–553 (1967) No month.

Drelich, J.; Miller, J. D.; Good, R. J. The effect of drop (bubble) size on advancing and receding contact angles for heterogeneous and rough solid surfaces as observed with sessile–drop and captive–bubble techniques, J. Colloid Interface Sci. 179:37–50 (1996) No month.

Durie, R. A.; Milne, J. W., Infrared spectra of anydrous alkali metal sulphates, Spectrochim. Acta, Part A, 34A:215–220 (1978) No month.

Emberly, E.; Kirczenow, G., Principles for the design and operation of a molecular wire transistor, J. Appl. Phys. 88:5280–5282 (2000) No month.

Engquist, I.; Liedberg, B., $D_2O$ ice on controlled wettability self-assembled alkanethiolate monolayers: cluster formation and substrate—adsorbate interaction, J. Phys. Chem. 100:20089–20096 (1996) No month.

Engström, P.; Ambernstsson, A.; Skoglundh, M.; Fridell, E.; Smedler, G.; Sulphur dioxide interaction with $No_x$ storage catalysts, Appl. Catal. B 22:L241–L248 (1999) No month.

Esplandiu, M. J.; Hagenstroem, H.; Kolb, D. M., Functionalized self-assembled alkanethiol monolayers on Au(111) electrodes: 1. Surface structure and electrochemistry, Langmuir 17:828–838 (2001) No month.

Evans, S. D.; Freeman, T. L.; Flynn, T. M.; Batchelder, D. N.; Ulman, A., Raman Spectroscopy of self-assembled mono- and multilayer films of alkanethiolate on gold, Thin Solid Films 244:778–783 (1994) No month.

Everhart, D. S., Using self-assembling monolayers for sensors, Chemtech 29:30–37 (1999) No month.

Fabianowski, W.; Jaccodine, R.; Kodnani, R.; Pearson, R.; Smektala, P., Coupling monolayers for protection of microelectronic circuits, Adv. Mater. Opt. Electron. 5:199–213 (1995) No month.

Ferretti, S.; Paynter, S.; Russell, D. A.; Sapsford, K. E.; Richardson, D. J., Self-assembled monolayers: a versatile tool for the formulation of bio-surfaces, Trends Anal. Chem. 19:530–540 (2000) No month.

Forzani, E. S.; Solis, V. M.; Calvo, E. J., Electrochemical behavior of polyphenol oxidase immobilized in self-assembled structures layer by layer with cationic polyallylamine, Anal. Chem. 72:5300–5307 (2000) No month.

Freund M. S.; Lewis, N. S., A chemically diverse conducting polymer-based "electronic nose", Proc. Natl. Acad. Sci. 92:2652–2656 (1995) No month.

Gardner, T. J.; Firsbie, C. D.; Wrighton, M. S., Systems for orthogonal self-assembly of electroactive monolayers on Au and ITO: an approach to molecular electronics, J. Am. Chem. Soc. 117:6927–6933 (1995) No month.

Gaspar, S.; Zimmermann, H.; Gazaryan, I.; Csoregi, E.; Schuhmann, Hydrogen peroxide biosensors based on direct electron transfer from plant peroxidases immobilized on self-assembled thiol–monolayer modified gold electrodes, W. Electroanalysis 13:284–288 (2001) No month avail.

Glodde, M.; Hartwig, A.; Hennemann, O.–D.; Stohrer, W.–D., Adhesion promoters for gold: Bis–(ω–aminoalkyl)–disulfides, Int. J. Adhes. Adhes. 18:359–364 (1998) No month avail.

Gooding, J. J.; Praig, V.; Hall, E. A. H., Platinum–catalyzed enzyme electrodes immobilized on gold using self-assembled layers, Anal. Chem. 70:2396–2402 (1998) No month avail.

Gorman, C. B.; Biebuyck, H. A.; Whitesides, G. M., Fabrication of patterned, electrically conducting polypyrrole using a self–assembled monolayer: a route to all–organic circuits, Chem. Mater. 7:526–529 (1995) No month avail.

Goss, C.A.; Charych, D. H.; Majda, M., Application of (3–Mercaptopropyl) trimethoxysilane as a molecular adhesive in the fabrication of vapor–deposited gold electrodes on glass substrates, Anal. Chem. 63:85–88 (1991) No month avail.

Graupe, M.; Koini, T.; Kim, H. I.; Garg, N.; Miura, Y. F.; Takenaga, M.; Perry, S. S.; Lee, T. R., Self–assembled monolayers of $CF_3$–terminated alkanethiols on gold, Colloids Surf., A 154:239–244 (1999) No month avail.

Grunze, M., Physical–chemical mechanisms of non–fouling surfaces, Proc. Annu. Meet. Adhes. Soc. 23:4–5 (2000) No month avail.

Hayes, W. A.; Kim, H.; Yue, X.; Perry, S. S.; Shannon, C., Nanometer–scale patterning of surfaces using self–assembly chemistry. 2. Preparation, characterization, and electrochemical behavior of two–component organotiol monolayers on gold surfaces, Langmuir 12:2511–2518 (1997) No month avail.

Hobara, D.; Miyake, K.; Imabayashi, S.–I.; Niki, K.; Kakiuchi, T., In–situ scanning tunneling microscopy imaging of the reductive desorption process of alkanethiols on Au(111), Langmuir 14:3590–3596 (1998) No month avail.

Hobara, D.; Ota, M.; Imabayashi, S.–I. Niki, K.; Kakiuchi, T., Phase separation of binary self–assembled thiol monolayers composed of 1–hexadecanethiol and 3–mercaptopropionic acid on Au(111) studies by scanning tunneling microscopy and cyclic voltammetry, J. Electroanal. Chem. 444:113–119 (1998) No month avail.

Hseuh, C.–C.; Liu, Y.; Henry, M.; Freund, M. S., Chemically diverse modified electrodes: A new approach to the design and implementation of sensor arrays, Anal. Chim. Acta, 397:135–144 (1999) No month avail.

Hseuh, C.–C.; Lee, M.–T.; Freund, M. S.; Ferguson, G. S., Electrochemically directed self–assembly on gold, Angew. Chem. Int. Eng. 39:1228–1230 (2000) No month avail.

Imbayashi, S.–I.; Iida, M.; Hobara, D.; Feng, Z. Q.; Niki, K.; Kakiuchi, T., Reductive Desorption of carboxylic–acid–terminated alkanethiol monolayers from Au(111) surfaces, J. Electroanal. Chem. 428:33–38 (1997) No month avail.

Imabayashi, S.–I.; Hobara, D.; Kakiuchi, T.; Knoll, W., Selective replacement of adsorbed alkanethiols in phase–separated binary self–assembled monolayers by electrochemical partial desoprtion, Langmuir 13:4502–4504 (1997) No month avail.

Imabayashi, S.–I.; Hobara, D.; Kakiuchi, T., Voltammetric detection of the surface diffusion of adsorbed thiolate molecules in artificially phase–separated binary self–assembled monolayers on a Au(111) surface, Langmuir 17:2560–2563 (2001) No month avail.

Ista, L. K.; Fan, H.; Baca, O.; Lopez, G. P., Attachment of bacteria to model solid surfaces: oligo(ethylene glycol) surfaces inhibit bacterial attachment, FEMS Microbiol. Lett. 142:59–63 (1996) No month avail.

Kaifer, A. E., Electrodes derivatized with mono– and multilayer assemblies containing preformed binding sites, Prog. Colloid Polym. Sci. 103:193–200 (1997) No month avail.

Kakiuchi, T.; Iida, M.; Gon, N.; Hobara, D.; Imabayashi, S.–i.; Niki, K., Miscibility of adsorbed 1–undecanethiol and 11–mercaptoundecanoic acid species in binary self–assembled monolayers on Au(111), Langmuir 17:1599–1663 (2001) No month avail.

Kakiuchi, T.; Sato, K.; Iida, M.; Hobara, D. Imabayashi, S.–i.; Niki, K., Phase separation of alkanethiol self–assembled monolayers during the replacement of adsorbed thiolates on Au(111) with thiols in solution, Langmuir 16:7238–7244 (2000) No month avail.

Kawaguchi, T.; Yasuda, H.; Shimazu, K.; Porter, Marc D.; Electrochemical quartz crystal microbalance investigation of the reductive desorption of self–assembled monolayers of alkanethiols and mercaptoalkanoic acids on Au, Langmuir 16:9830–9840 (2000) No month avail.

Kice, J. L., A kinetic study of the acid hydrolysis of a bunte salt, J. Org. Chem. 28:957961 (1963) No month avail.

Kondo, T.; Yanagida, M.; Shimazu, K.; Uosaki, K., Determination of thickness of a self–assembled monolayer of dodecanethiol on Au(111) by angle–resolved x–ray photoelectron spectroscopy, Langmuir 14:5656–5658 (1998) No month avail.

Kumar, A.; Biebuyck, H.; Whitesides, G. M., Patterning self–assembled monolayers: Application in materials science, Langmuir 10:1498–1511 (1994) No month avail.

Kumar, A.; Whitesides, G. M. Features of gold having micrometer to centimeter dimensions can be formed through a combination of stamping with an elastomeric stamp and an alkanethiol "in" followed by chemical etching, Appl. Phys. Letter 163:2002–2004 (1993), No month avail.

Kwan, W. S. V.; Penneau, J. F.; Miller, L. L., ESR and electrochemical studies of self assembled oligoimide monolayers on gold, J. Electroanal. Chem. Interfacial Electrochem. 291:295–299 (1990) No month avail.

Laibinis, P. E.; Fox, M. A.; Folkers, J. P.; Whitesides, G. M., Comparisons of self–assembled monolayers on silver and gold: mixed monolayers derived from $HS(CH_2)_{21}X$ and $HS(CH_2)_{10}Y$ (X, Y=$CH_3$, $CH_2OH$) have similar properties, Langmuir 7:3167–3173 (1991) No month avail.

Laibinis, P. E.; Whitesides, G. M., ω–Terminated alkanethiolate monolayers on surfaces of copper, silver, and gold have similar wettabilities, J. Am. Chem. Soc. 114:1990–1995 (1992) No month avail.

Lee, M.–T.; Hsueh, C.–C.; Freund, M. S.; Ferguson, G. S., Air oxidation of self–assembled monolayers on polycrystalline gold: the role of the gold substrate, Langmuir 22:6419–6423 (1998) No month avail.

Lee, T. R.; Carey, R. I.; Biebuyck, H. A.; Whitesides, G. M., The wetting of monolayer films exposing ionizable acids and bases, Langmuir 10:741–749 (1994) No month avail.

Lee, Y. J.; Jeon, I. C.; Paik, W.–k.; Kim, K., Self–assembly of 1,2–Benzenedithiol on gold and silver: Fourier transform infrared spectroscopy and quartz crystal microbalance study, Langmuir 12:5830–5837 (1996) No month avail.

Liedberg, B; Cooper, J. M., Bioanalytical applications of self–assembled monolayers, in Immobilized Biomolecules in Analysis; Cass, T.; Ligler, F. S. Ed.; Oxford University Press, pp. 55–78 (1998) No month avail.

Lindner, E., A low surface free energy approach in the control of marine biofouling, Biofouling 6:193–205 (1992) No month avail.

Lukkari, J.; Meretoja, M; Kartio, I.; Laajalehto, K.; Rajamaeki, M.; Lindstroem, M.; Kankare, J., Organic thiosulfates (bunte salts): novel surface–active sulfur compounds for the preparation of self–assembled monolayers on gold, Langmuir 10:3529–3537 (1999) No month avail.

Mancke, R. G., A moisture protection screening test for hybrid circuit encapsulants, IEEE Trans. Comp. Hybr. Manuf. Techn. CHMT–4:492–498 (1981) No month avail.

McCarley, T. D.; McCarley, R. L., Toward the analysis of electrochemically modified self–assembled monolayers. Electrospray ionization mass spectrometry of organothiolates, Anal. Chem. 69:130–136 (1997) No month avail.

Miller, C.; Curndet, P.; Grätzel, M., Adsorbed ω–hydroxy thiol monolayers on gold electrodes: evidence for electron tunneling to redox species in solution, J. Phys. Chem. 95:877–886 (1991) No month avail.

Milligan, B. L.; Swan, L. M., New syntheses of disulphides from bunte salts, J. Chem. Soc. 2172–2177 (1962) No month avail.

Miura, Y. F.; Takenaga, M.; Koini, T.; Graupe, M.; Garg, N.; Graham, R. L. Jr.; Lee, T. R., Wettabilities of self–assembled monolayers of generated from $CF_3$–terminated alkanethiols on gold, Langmuir 14:5821–5825 (1998) No month avail.

Nakanishi, T.; Ohtani, B.; Uosaki, K., Fabrication and characterization of DcS–nanoparticle mono– and multilayers on a self–assembled monolayer of alkaneditiols on gold, J. Phys. Chem. B 102:1571–1577 (1998) No month avail.

Nishimura, N.; Ooi, M.; Shimazu, K.; Fujii, H.; Uosaki, K., Post–assembly insertion of metal ions into thiol–derivatized porphyrin monolayers on gold, J. Electroanal. Chem. 473:75–84 (1999) No month avail.

Nishizawa, M.; Sunagawa, T.; Yoneyama, H.; Suita, Y.–O., Selective desorption of 3–mercaptopropionic acid from a mixed monolayer with hexadecanethiol assembled on a gold electrode, J. Electroanal. Chem. 436:213–218 (1997) No month avail.

Norrod K. L.; Rowlen, K. L., Ozone–induced oxidation of self–assembled decanethiol: contributing mechanism for "photooxidation"? J. Am. Chem. Soc. 120:2656–2657 (1998) No month avail.

Nuzzo, R. G.; Allara, D. L., Adsorption of bifunctional organic disulfides on gold surfaces, J. Am. Chem. Soc. 105:4481–4483 (1983) No month avail.

Nyquist, R. M.; Eberhardt, A. S.; Silks, L. A., III; Li, Z.; Yang, X.; Swanson, B. I., Characterization of self–assembled monolayer for biosensor applications, Langmuir 16:1793–1800 (2000) No month avail.

Olsson, C–O. A.; Agarwal, P.; Frey, M.; Landolt, D., An XPS study of the adsorption of organic inhibitors on mild steel surfaces, Corros. Sci. 42:1197–1211 (2000) No month avail.

Opila, R. L.; Legrange, J. D.; Markham, J. L.; Heyer, G.; Schroeder, C. M., Effects of surface hydration on the deposition of silane monolayers on silica optical fiber, J. Adhes. Sci. Technol. 11:1–10 (1997) No month avail.

Orzeszko, A.; Czerwinski, A.; Kazimierczuk, Z., The electrochemical oxidation of bunte sales as a method for polydisulfides synthesis, J. Polym. Mater. 11:21–23 (1997) No month avail.

Price, T. S.; Twiss, D. F., The electrolytic preparation of disulphides. Part I. Dibenzyl disulphide and diethyl disulphide, J. Chem. Soc. 2021–2031 (1907) No month avail.

Price, T. S.; Twiss, D. F., The preparation of disulphides. Part II. The action of alkalis on sodium alkyl thiosulphates. J. Chem. Soc. 1395–1400 (1980) No month avail.

Price, T. S.; Twiss, D. F., The preparation of disulphides. Part III. The nitrobenzyl disulphides, J. Chem. Soc. 1401–1405 (1908) No month avail.

Quon, R. A.; Ulman, A.; Vanderlick, T. K., Impact of humidity on adhesion between rough surfaces, Langmuir 16:8912–8916 (2000) No month avail.

Riepl, M.; Mirsky, V. M.; Wolfbeis, O. S., Electical control of alkanethiols self–assembly on a gold surface as an approach for preparation of microelectrode arrays, Mikrochim. Acta 131:29–34(1999) No month avail.

Reinerth, W. A.; Jones, L., II: Burgin, T. P.; Zhou, C.–W.; Muller, C. J.; Deshpande, M. R.; Reed, M. A.; Tour, J. M., Molecular Scale electronics: syntheses and testing, Nanotechnology 9:246–250 (1998) No month avail.

Raj, C.R.; Ohsaka, T., Facilitated electrochemical oxidation of NADH and its model compound at gold electrode modified with terminally substituted electroinactive self–assembled monolayers, Bioelectrochem. 53:251–256 (2001) No month avail.

Ricco, A. J.; Crooks, R. M.; Osbourn, G., Surface acoustic wave chemical sensor arrays: new chemically sensitive interfaces combined with novel cluster analysis to detect volatile organic compounds and mixtures, Acc. Chem. Res. 31:289–296 (1998) No month avail.

Rudolph, A. S., Biomaterial biotechnology using self–assembled lipid microstructures, J. Cell Biochem. 56:183–187 (1994) No month avail.

Sampath, S.; Lev, O., 3d organized self–assembled monolayer electrodes: a novel biosensor configuration, Adv. Mater. 9:410–413 (1997) No month avail.

Sato, Y.; Mizutani, F.; Tsukuba, H., Electrochemical responses of cytochrome c on a gold electrode modified with mixed monolayers of 3–mercaptopropionic acid and n–alkanethiol, J. Electroanal. Chem. 438:99–104 (1997), No month avail.

Sawaguchi, T.; Sato, Y.; Mizutani, F., In situ STM imaging of individual molecules in two–component self–assembled monolayers of 3–mercaptopropionic acid and 1–decanethiol on Au(111), J. Electroanal. Chem. 496:50–60 (2001) No month avail.

Schoenfisch, M. H.; Ovadia, M.; Pemberton, J. E., Covalent surface chemical modification of electrodes for cardiac pacing applications, J. Biomed. Mater. Res. 51:209–215 (2000) No month avail.

Schoenfisch M. H.; Pemberton, J. E., Air stability of alkanethiol self–assembled monolayers on silver and gold surfaces, J. Am. Chem. Soc. 120:4502–4513 (1998) No month avail.

Schneider, T. W.; Buttry, D. A., Electrochemical quartz crystal microbalance studies of adsorption and desorption of self–assembled monolayers of alkyl thiols on gold, J. Am. Chem. Soc. 115:12391–12399 (1993) No month avail.

Scofield, J. H., Hartree–Slater shubshell photoionization cross–sections at 1254 and 1487 eV, J. Electron. Spectrosc. 8:129–137 (1976) No month avail.

Scott, J. R.; Baker, L. S.; Everett, W. R.; Wilkins, C. L.; Fritsch, I., Laser desorption fourier transform mass spectrometer exchange studies of air–oxidized alkanethiol self-assembled monolayers on gold, Anal. Chem. 69:2636–2639 (1997) No month avail.

Silin, V.; Weetall, H., Surface plasmon resonance studies of the adhesion of human IgG and BSA to gold surfaces modified by self–assembled monolayers (SAM), Proc. Annu. Meet. Adhes. Soc. 19:211–214 (1996) No month avail.

Spinke, J.; Liley, M.; Guder, H. J.; Angermaier, L.; Knoll, W., Molecular Recognition at self–assembled monolayers: the construction of multicomponent multilayers, Langmuir 9:1821–1825 (1993) No month avail.

Szafranski, C. A.; Tanner, W.; Laibinis, P. E.; Garrell, R. L., Surface–enhanced raman spectroscopy of aromatic thiols and disulfides on gold electrodes, Langmuir 14:3570–3579 (1998) No month avail.

Tarlov, M. J.; Burgess, D. R. F., Jr.; Gillen, G., UV photopatterning of alkanethiolate monolayers self–assembled on gold and silver, J. Am. Chem. Soc. 115:5305–5306 (1993) No month avail.

Tao, Y.-T.; Kannaiyan, P.; Lee, W.-C., Microfabrication of interdigitated polyaniline/polymethylene patterns of a gold surface, Langmuir 14:6158–6166 (1998) No month avail.

Tender, L. M.; Opperman, K. A.; Hampton, P. D.; Lopez, G. P., Fabrication of microscopic biosensor arrays without microscopic alignment, Adv. Mater. 10:73–75 (1998) No month avail.

Tender, R. L.; Worley, H.; Fan, H.; Lopez, G. P., Electrochemical patterning of self–assembled monolayers onto microscopic arrays of gold electrodes fabricated by laser ablation, Langmuir 12:5515–5518 (1996) No month avail.

Thomas, R. C.; Sun, L.; Crooks, R. M.; Ricco, A. J., Real–time measurements of the gas–phase adsorption of n–Alkylthiol mono– and multilayers on gold, Langmuir 7:620–622 (1991) No month avail.

Tour, J. M.; Jones, L. II; Pearson, D L.; Lamba, J. J. S.; Burgin, T. P.; Whitesides, G. M.; Allara, D. L.; Parikh, A. N.; Atre, S., Self–assembled monolayers and multilayers of conjugated thiols, α,ω–dithiols, and thioacetyl–containing adsorbates. Understanding attachments between potential molecular wires and gold surfaces, J. Am. Chem. Soc. 117:9529–9534 (1995) No month avail.

Ulman, A., Formation and structure of self–assembled monolayers, Chem. Rev. 96:1533–1554 (1996) No month avail.

Ulman, A., Wetting studies of molecularly engineered surfaces, Thin Solid Films 273:48–53 (1996) No month avail.

Walczak, C. A.; Alves, C. A.; Lamp, B. D., Electrochemical and x–ray photoelectron spectroscopic evidence for differences in the binding sites of alkanethiolate monolayers chemisorbed at gold, J. Electroanal. Chem. 396:103–114 (1995) No month avail.

Walczak, M. M.; Popenoe, D. D.; Deihammer, R. S.; Lamp, B. D.; Chung, C.; Porter, M. D., Reductive desorption of alkanethioliate monolayers at gold: a measure of surface coverage, Langmuir 7:2687–2693 (1991) No month avail.

Weiss, U.; Sokol, A., N–Arylamides of mercaptoacetic acid, J. Am. Chem. Soc. 72:–1680–1687 (1950) No month avail.

Weisshaar, D. E.; Lamp, B.D.; Porter, M. D., Thermodynamically controlled electrochemical formation of thiolate monolayers at gold: characterization and comparison to self–assembled analogs, J. Am. Chem. Soc. 114:5860–5862 (1992) No month avail.

Westlake, H. E. Jr., Dougherty, G., The use of bunte salts in synthesis. I. The preparation of mercaptals, J. Am. Chem. Soc. 63:658–659 (1941) No month avail.

Westlake, H. E. Jr., Dougherty, G., The use of bunte salts in synthesis. I. The preparation of aliphatic disulfides, J. Am. Chem. Soc. 64:149–150 (1942) No month avail.

Wiencek, K. M., Fletcher, M., Effects of substratum wettability and molecular topography on the initial adhesion of bacteria to chemically defined substrata, Biofouling 11:293–311 (1997) No month avail.

Wiencek, K. M.; Fletcher, M., Bacterial adhesion to hydroxyl– and methyl–terminated alkanethiol self–assembled monolayers, J. Bacteriol. 177:1959–1966 (1995) No month avail.

Wilbur, J. L.; Biebuyck, H. A.; MacDonald, J. C.; Whitesides, G. M., Scanning force microscopies can image patterned self–assembled monolayers, Langmuir 11:827–831 (1995) No month avail.

Wilbur, J. L.; Kim, E.; Xia, Y.; Whitesides, G. M., Lithographic molding: a convenient route to structures with sub–micrometer dimensions, Adv. Mater. 7:649–652 (1995) No month avail.

Willner, I.; Katz, E.; Riklin, R.; Kasher, R., Mediated electron transfer in glutathione reductase organized in self–assembled monolayers on Au electrodes, J. Am. Chem. Soc. 114:10967–10966 (1992) No month avail.

Wittstock, R.; Hesse R.; Schuhmann, W., Patterned self–assembled alkanethiolate monolayers on gold. Patterning and imaging by means of scanning electrochemical microscopy, Electroanalysis 9:746–750 (1997) No month avail.

Wong, Sze–Shun; Porter, M. D., Origin of the multiple voltammetric desorption waves of long–chain alkanethiolate monolayers chemisorbed on annealed gold electrodes, J. Electroanal. Chem. 485:135–143 (2000) No month avail.

Xia, Y.; Kim, E.; Whitesides, G. M., Microcontact printing of alkanethiols on silver and its application in microfabrication, J. Electrochem. Soc. 143:1070–1079 (1996) No month avail.

Xia, Y.; Zhao, X.–M.; Whitesides G. M., Pattern transfer: self–assembled monolayers as ultrathin resists, Microelectron. Eng. 32:255–268 (1996) No month avail.

Yang, D.–F.; Al–Maznai, H.; Morin, M., Vibrational study of the fast reductive and the slow oxidative desorptions of a nonanethiol self–assembled monolayer from a Au(111) single crystal electrode, J. Phys. Chem. B. 101:1158–1166 (1997) No month avail.

Yang, D.–F.; Morin, M., Chronoamperometric study of the reduction of chemisorbed thiols on Au(111), J. Electroanal. Chem. 429:1–5 (1997) No month avail.

Yang, D.–F.; Morin, M., Chronoamperometric study of the reductive desorption of alkanethiol self–assembled monolayers, J. Electroanal. Chem. 441:173–181 (1998) No month avail.

Yang, D.–F.; Wilde, C. P.; Morin, M., Studies of the electrochemical removal and efficient re–formation of a monolayer of hexadecanethiol self–assembled at an Au(111) single crystal in aqueous solutions, Langmuir 12:243–249 (1997) No month avail.

Rabinovich, E.M. et al., Compact Phase–Sensitive Multichannel Detection System with Array Measurements of Biosensor Chips, Proc. SPIE–Int. Soc. Opt. Eng. 3926:181–185 (2002) No month avail.

Zhang, Y.; Terrill, R. H.; Tanzer, T. A.; Born, P. W., Ozonolysis is the primary cause of UV photooxidation of alkanethiolate monolayers at low irradiance, J. Am. Chem. Soc. 120:2654–2655 (1998) No month avail.

Zhong, C.–J.; Porter, M. D., Evidence for carbon–sulfur bond cleavage in spontaneously adsorbed organosulfide––based monolayers at gold, J. Am. Chem. Soc. 116:11616–11617 (1994) No month avail.

Zhong, C.–J.; Zak, J.; Porter, M.D., Voltammetric reductive desorption characteristics of alkanethioate monolayers at single crystal Au(111) and (110) electrode surfaces, J. Electroanal. Chem. 421:9–13 (1997) No month avail.

Zhuk, A. V.; Evans, A. G.; Hutchinson, J. W.; Whitesides, G. M., The adhesion energy between polymer thin films and self–assembled monolayers, J. Mater. Res. 12:3555–3564 (1998) No month avail.

* cited by examiner

ELECTROCHEMICALLY DIRECTED SELF-ASSEMBLY OF MONOLAYERS ON METAL

RELATED APPLICATIONS

This application claims priority to the U.S. Provisional Application Ser. No. 60/274,480, filed Mar. 9, 2001, by Ferguson et al., and entitled "ELECTROCHEMICALLY DIRECTED SELF-ASSEMBLY OF MONOLAYERS ON GOLD," the disclosure of which is incorporated herein by reference in its entirety, including any drawings.

The invention disclosed herein was made with U.S. Government support under Grant No. EEC 9612504, awarded by the National Science Foundation. The Government has certain rights in this invention.

FIELD OF THE INVENTION

The present invention is in the field of preparing self-assembled monolayers on a metal using electrolysis.

BACKGROUND OF THE INVENTION

Molecular self-assembly of monolayers (SAMs) provides a simple method to form highly ordered two-dimensional organic assemblies. Among the various systems that display this behavior, SAMs formed by the chemisorption of alkanethiols on gold to produce strong gold-thiolate bonds is particularly convenient because of the ease of their preparation. [1–3] Well-ordered SAMs form spontaneously on gold surfaces within a short period upon immersion of the surface in either a dilute solution or the vapor of an alkanethiol of interest. These monolayers have been used as model systems for fundamental studies of wettability [4], adhesion [5], biocompatibility [6], fouling [7], as well as serving as the basis for building multilayers [8] and bio- and analytical sensors [9], for the immobilization of biomolecules [10], and for preparing patterned surfaces [11].

One of the most attractive characteristics of self-assembled monolayers (SAMs) is the facility of their preparation—simply exposing a substrate surface to an appropriate adsorbate-[1–3] though this facility prevents selective formation at particular surfaces in the presence of others of the same composition. While contact printing of SAMs has proven useful in preparing mesoscale patterns on various substrates [12], formation of monolayers on only particular features of a pre-existing pattern—such as an electrode array, an integrated circuit, or a MEMS device—has remained an elusive synthetic challenge. Hence, treating an array of identical gold electrodes with a solution of an alkanethiol or alkyl disulfide would result in formation of a monolayer on all of the electrodes. One approach to controlling self-assembly in these systems has focused on the inability of thiolate ions to covalently bind the gold surface directly, without concomitant oxidation. [13] Hence, gold electrodes immersed in a solution of thiolate ions will only adsorb a SAM if held at a sufficiently high potential. Electrochemistry, in this case reduction, can also be used to remove SAMs that had previously been adsorbed. [14] Hence, an alternative strategy for producing patterns involves allowing indiscriminate self-assembly to occur, followed by articulation of a pattern by the selective removal of the SAM from certain substrates.

Alkylthiosulfates, also known as Bunte salts, can be used to synthesize disulfides by oxidation [15], acidic hydrolysis [16–17], or alkaline degradation [18]. Disulfides also can be formed from Bunte salts electrochemically. [19–20] This method has been extended to form polydisulfides from "double" Bunte salts, molecules carrying two thiosulfate groups, using electrochemistry with gold electrodes. [21]

SUMMARY OF THE INVENTION

Disclosed is a method of preparing self-assembled monolayers on a metal comprising electrolyzing a thiosulfate compound in a solvent, where the electrolysis is performed at a voltage for a period of time.

Also disclosed is a method of preparing self-assembled organic monolayers on a metal comprising (a) contacting said metal with a solution comprising an organic thiosulfate compound, and (b) electrolyzing said organic thiosulfate compound by applying on said metal sufficiently high anodic potential for sufficient time to result in the oxidative self-assembly of said monolayers on said metal.

Further, a method is disclosed for the selective formation of self-assembled organic monolayers on a first metal electrode in the vicinity of a second metal electrode, comprising (a) contacting said metal electrodes with a solution comprising an organic thiosulfate compound under conditions such that chemisorption of said organic thiosulfate compound onto said first and second electrodes does not occur, and (b) electolyzing said organic thiosulfate compound by selectively applying on said first metal electrode sufficiently high anodic potential for sufficient time to result in the oxidative self-assembly of said organic monolayers on said first electrode.

DETAILED DESCRIPTION OF THE PREFERRED EMBODIMENT

Figure 1:
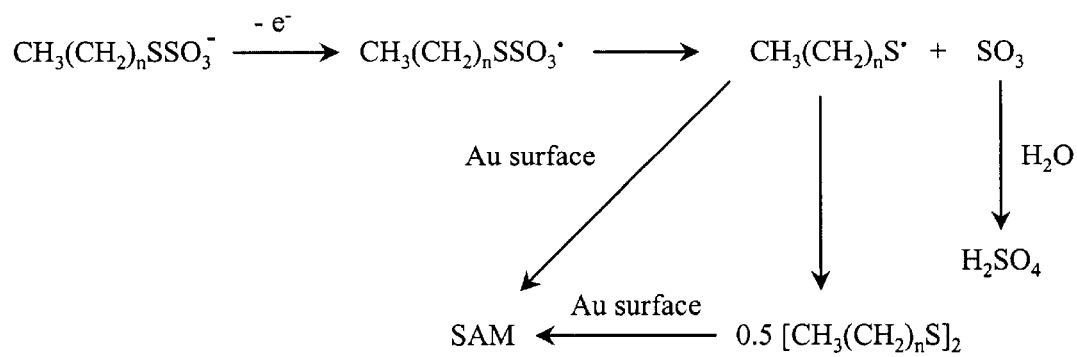
FIG. 1 is a schematic representation of the proposed mechanism of electrochemical synthesis of self-assembled monolayers on gold.

Aspects of the present invention relate to the formation of self-assembled monolayers (SAMs) on metallic surfaces.

The SAMs of the present invention provide selective and facile modification of surfaces that can be useful in a number of different applications. For example, SAMs can provide a passivating film on a metallic surface, thereby protecting the surface from corrosion or oxidation. SAMs can provide a barrier, through which the oxidant, such as air, or the corrosive material cannot penetrate to reach the metal surface. In many instances, portions of SAMs can be selectively removed, or selected portions of the metal can be covered with SAMs, thereby providing for a selective oxidation or corrosion of parts of the metal surface. Such selective oxidation or corrosion is very useful in certain electronic arts, such as the formation of silicon chips or integrated circuits.

SAMs can also be used in the biological arts. For instance, after deposition of SAMs, some reactive functional groups can be chemically modified to obtain a more diverse set of surface chemistries. The immobilization of molecules such as peptides, proteins and antibodies on the surface, can create a well-defined surface capable of inducing a specific biological response. These surfaces are stable in aqueous media allowing their use in cell culture for several days. SAMs can be used to study proliferation and adhesion of human corneal epithelial cells, adhesion of polymorphonuclear leukocytes, bacterial adhesion studies, platelet reactivity and also protein and antibody immobilization. SAMs can also be used to study human albumin adsorption.

Other areas where SAMs may be applied include, but are not limited to, the production of biosensors, where SAMs can immobilize enzymes or other biologically active compounds; biocompatibility studies, where SAMs inhibit adsorption of proteins or other biologically active compounds; tissue engineering, where SAMs direct cell adhesion and growth; molecular electronics, where SAMs facilitate the assembly of molecular scale layers and control their formation in molecular devices; microelectronics, where SAMs are useful in passivating layers and dielectric layers; wetting and adhesion, which impact fabrication and manufacturing processes as well as determine material properties; fabrication, where SAMs direct subsequent reactions by presenting adsorption or catalytic sites; and sensors, where SAMs facilitate the immobilization of tailored binding sites or analytes.

In one aspect, the present invention provides methods for the selective deposition of SAMs. One of skill in the art will recognize the advantages of this selective deposition. For example, the present invention allows for the selective deposition of a passivating layer on an electrode, while an adjacent electrode remains unmodified and subject to oxidation or other manipulation. This would be particularly useful in the manufacture of microelectronic devices and integrated circuits.

In another example, selective deposition of SAMs facilitates the formation of arrays with a variety of surface terminations. For example, a SAM can be deposited on a portion of a substrate and modified to provide a binding site that can be used to detect a specific analyte. A second SAM can then be deposited on an adjacent portion of the substrate and modified to recognize a different analyte. This process can be repeated to create as complex an array as desired. Such an array would be useful, for example, in determining the presence or absence of a number of different analytes in a single sample, such as in a biological fluid like blood or urine.

The present inventors discovered that if oxidation of Bunte salts occurred at a gold electrode, trapping of the intermediates or products of the oxidation provides a selective method for driving self-assembly only at electrodes held a sufficiently high potential. Aspects of this discovery, summarized in FIG. 1, provide that oxidation may lead to formation of an alkylsulfide radical by release of $SO_3$. [19,20] This radical then may combine directly with a dangling bond at the gold surface, or may couple to form disulfide. Either of these pathways may lead to formation of SAMs, as disulfides readily oxidatively add to gold surfaces. [22] Finally, $SO_3$ may react with any water in the solvent to form sulfate ion. Sulfuric acid produced in this way may be involved in monolayer formation, via acid hydrolysis of the Bunte salt to give thiol.

The monolayers produced in this way are very similar to those prepared in the conventional method, by chemisorption of alkanethiols. One aspect of the present invention addresses aspects of the mechanism of the electrochemical synthesis of monolayers in this way, including the inhibition of spontaneous chemisorption of alkylthiosulfates in the presence of tetrabutylammonium tetrafluoroborate, and identification of the side-product(s) of the process.

Certain other aspects of the present invention involve the selective formation by oxidation of alkylthiosulfates selectively in specific locations on a set of closely spaced microelectrodes. [23] The resulting chemical differentiation at small scales of length is very useful in microelectronic and sensor applications. For example, this method can be used to build a sensor that has SAMs with different functionalities on an each member of an electrode array. Aspects of the present invention provide for an alternative approach to the synthesis of SAMs that offer several attractive features: for example, without limitation, they allow control of the degree of coverage, require only short adsorption times (<1 min), do not require clean substrates, [23] and use precursors that do not have unpleasant odors (for n-alkyl chains greater than about 10 carbons in length).

Thus, an aspect of the present invention relates to a method of preparing self-assembled monolayers on a metal comprising electrolyzing a thiosulfate compound in a solvent, where the electrolysis is performed at a voltage for a period of time.

In another aspect, the invention relates to a method of preparing self-assembled organic monolayers on a metal comprising (a) contacting the metal with a solution comprising an organic thiosulfate compound, and (b) electrolyzing the organic thiosulfate compound by applying on the metal sufficiently high anodic potential for sufficient time to result in the oxidative self-assembly of the monolayers on the metal.

In a further aspect, the invention relates to a method for the selective formation of self-assembled organic monolayers on a first metal electrode in the vicinity of a second metal electrode, comprising (a) contacting said metal electrodes with a solution comprising an organic thiosulfate compound under conditions such that chemisorption of said organic thiosulfate compound onto said first and second electrodes does not occur, and (b) electrolyzing said organic thiosulfate compound by selectively applying on said first metal electrode sufficiently high anodic potential for sufficient time to result in the oxidative self-assembly of said organic monolayers on said first electrode.

In certain embodiments, the metal on which the monolayers are assembled is a transition metal. A "transition metal" is a metal within columns 3–12 of the periodic table. Some main group metals are also suitable for monolayer formation. Some of the metals contemplated within the scope of the invention include scandium, titanium, vanadium, chromium, manganese, iron, cobalt, nickel, copper, zinc, gallium, yttrium, zirconium, niobium, molybdenum, technetium, ruthenium, rhodium, palladium, silver, cadmium, indium, tin, lanthanum, hafnium, tantalum, tungsten, rhenium, osmium, iridium, platinum, gold, mercury, thalium, and lead. The metal may be in its elemental form or in a compound form. In some embodiments, the metal is selected from the group consisting of gold, silver, mercury, titanium, which may be in titanium dioxide form, and copper. In other embodiments, the metal is gold.

It is known in the art of electrolysis that to affect either reduction or oxidation, one may control the current and allow the voltage to vary, or control the current and allow the voltage to vary. Thus, in certain embodiments of the present invention electrolysis is carried out while the voltage is controlled, while in other embodiments electrolysis is carried out while the current is controlled.

A "thiosulfate" group is a substituent with the following structure.

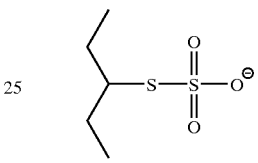

Any compound bearing this substituent is called a "thiosulfate compound." When the thiosulfate group is attached to an organic moiety, the resulting compound is an "organic thiosulfate." In certain embodiments, the thiosulfate compound has the formula R—S—$SO_3$M, where R is selected from the group consisting of hydrogen, branched chain or straight chain alkyl, cycloalkyl, cycloalkenyl, heterocycle, aromatic ring, and heteroaromatic ring, each of which may be optionally substituted; and M is a counterion.

The R group in the above formula may be substituted or unsubstituted. When substituted, the substituent group(s) is(are) one or more group(s) individually and independently selected from cycloalkyl, aryl, heteroaryl, heteroalicyclic, hydroxy, alkoxy, aryloxy, mercapto, alkylthio, arylthio, cyano, halo, carbonyl, thiocarbonyl, O-carbamyl, N-carbamyl, O-thiocarbamyl, N-thiocarbamyl, C-amido, N-amido, S-sulfonamido, N-sulfonamido, C-carboxy, O-carboxy, isocyanato, thiocyanato, isothiocyanato, nitro, silyl, trihalomethanesulfonyl, and amino, including mono- and di-substituted amino groups, and the protected derivatives thereof. Wherever a substituent is described as being "optionally substituted" that substituent may be substituted with one of the above substituents.

In certain embodiments, the R group in the above formula may be a polymer. In that case, the thiosulfate moiety is a substituent on the polymer. SAMs prepared with polymeric R groups are very useful as adhesion promoters between polymer chains or between polymers.

As used herein, the term "alkyl" refers to an aliphatic hydrocarbon group. The alkyl moiety may be a "saturated alkyl" group, which means that it does not contain any alkene or alkyne moieties. The alkyl moiety may also be an "unsaturated alkyl" moiety, which means that it contains at least one alkene or alkyne moiety. An "alkene" moiety refers to a group consisting of at least two carbon atoms and at least one carbon-carbon double bond, and an "alkyne" moiety refers to a group consisting of at least two carbon atoms and at least one carbon-carbon triple bond. The alkyl moiety, whether saturated or unsaturated, may be branched, straight chain, or cyclic.

The term "aromatic" refers to an aromatic group which has at least one ring having a conjugated pi electron system and includes both carbocyclic aryl (e.g., phenyl) and heterocyclic aryl groups (e.g., pyridine). The term includes monocyclic or fused-ring polycyclic (i.e., rings which share adjacent pairs of carbon atoms) groups. The term "carbocyclic" refers to a compound which contains one or more covalently closed ring structures, and that the atoms forming the backbone of the ring are all carbon atoms. The term thus distinguishes carbocyclic from heterocyclic rings in which the ring backbone contains at least one atom which is different from carbon. The term "heteroaromatic" refers to an aromatic group which contains at least one heterocyclic ring.

In certain embodiments, R is a straight chain alkyl and the thiosulfate compound has the formula $CH_3(CH_2)_nSSO_3M$. In some embodiments n is between 0 and 50, in other embodiments n is between 5 and 30, in still other embodiment n is between 7 and 15. In certain embodiments n is selected from the group consisting of 5, 6, 7, 8, 9, 10, 11, 12, 13, 14, 15, 16, 17, 18, 19, and 20, whereas in other embodiments n is selected from the group consisting of 7, 9, 11, 13, and 15.

In some embodiments M is a metal ion, while in other embodiments M is nonmetallic. M may be an alkali metal ion, selected from the group consisting of lithium ion, sodium ion, potassium ion, and cesium ion.

In certain embodiments, the solvent comprises a nonpolar compound, while in other embodiments the solvent comprises a polar compound. The solvent may also be a protic solvent or an aprotic solvent. "Protic solvents" are those that are capable of donating a proton to a solute. Examples of protic solvents include, but are not limited to, water and alcohols, such as methanol, ethanol, and isopropanol. "Aprotic solvents" are those solvents that, under normal reaction conditions, do not donate a proton to a solute. Typical organic solvents, such as hexane, toluene, benzene, methylene chloride, dimethlyformamide, chloroform, tetrahydrofuran, diethylether, dimethylether, acetonitrile, dimethylsulfoxide, acetone, are some of the examples of aprotic solvents.

Other embodiments of the invention include those in which a salt is added to the solvent. The salt may be one which comprises a halogen atom or a halide ion. "Halogens" are selected from the group consisting of fluorine, chlorine, bromine, and iodine. In certain embodiments, the salt is selected from the group consisting of a salt of a perhalate ($XO_4^-$), tetraalkylammonium tetrahaloborate ($R_4NBX_4$), tetraalkylammonium hexahalophosphate ($R_4NPX_6$), and tetraalkylammonium perhalate ($R_4NXO_4$). In all of the above formulae, "X" is a halide and R is an alkyl group, as defined herein. In some embodiments, the salt is selected from the group consisting of lithium perchlorate, tetrabutylammonium tetrafluoroborate, tetrabutylammonium hexafluorophosphate, and tetrabutylammonium perchlorate.

In some of the embodiments, the anion of the salt being added exhibits the characteristics of a base. The base may be a Lewis base, i.e., a moiety that can donate an electron pair, or it may be a proton acceptor. In other embodiments, the anion of the salt being added does not exhibit any noticeable basic characteristics.

In some embodiments of the invention, the voltage is applied cyclically. The term "cyclically" denotes those instances where the voltage is raised, or lowered, from a first voltage to a second voltage and then returned to the first voltage. The voltage may be changed linearly, stepwise, sinosoidally, exponentially, or a combination thereof. Thus, a pulse voltage, where the voltage is at a first value, is raised stepwise to a second value, held there at a time interval, and then returned to the first value is a cyclic application of voltage. Similarly, performing cyclic voltammetry, where the voltage is applied at a first value, is raised linearly to a second value, is then lowered linearly to a third value, which is lower than the first value, and then is raised to the first value, is also considered a cyclic application of voltage.

In certain embodiments the voltage change is between −1 and +2 volts, while in other embodiments it is between −0.9 and +1.6 volts, and in still other embodiments it is between −0.9 and +1.2 volts.

In some embodiments the voltage is applied for only one cycle, while in other embodiments the cycle is repeated for a number of times. There is no upper limit for how many times the cycle may be repeated. Those of skill in the art can recognize when the reaction is complete and stop the application of electricity. Thus, in some embodiments the voltage is applied for at least 5 cycles, while in other embodiments the voltage is applied for at least 3 cycles, and in still other embodiments the voltage is applied for at least 1 cycle.

As disclosed above, the voltage may be applied as a pulse, either as a single pulse or as a series of pulses. There is no upper limit for how many times a pulse may be applied. Those of skill in the art can recognize when the reaction is complete and stop the application of electricity. Thus, in some embodiments the series of pulses comprises at least 150 pulses, at least 20 pulses, at least 15 pulses, at least 10 pulses, at least 5 pulses, at least 3 pulses, or at least 1 pulse.

In some embodiments, after the voltage is raised from a first value to a second value in a pulse, it may then be raised to a third value, then to a forth value, and so on. The voltage may be raised in increments of 0.1 V or in any other increment that is feasible using the instrument being used.

The range of voltages applied can vary depending on the type of electrode and the type of instrument used. In some embodiments, the pulses are applied as increments of 0.1 V in the range of −0.6 V to +1.6 V.

When applying a pulse, the voltage is held at the second value for a period of time. The longer the voltage is held, the more thiosulfate compound is oxidized. However, the more thiosulfate compound is oxidized, the more the oxidized product may diffuse away from the electrode and engage in undesirable side reactions. Therefore, it is desirable to use shorter pulses more times than longer pulses less times. There is no limit as to how long a pulse can last. Of course, at some point, there would be no more thiosulfate compound to be oxidized. At this point the application of any more electricity would be useless. The limit for how short a pulse can last is defined by the instrument used. Thus, in certain embodiments the voltage at each step is held for at least 5 seconds, at least 2 seconds, at least 1 second, at least 500 ms, at least 200 ms, at least 100 ms, at least 50 ms, at least 10 ms, or at least 5 ms.

Aspects of the present invention relate to an electrochemical method for the selective formation of self-assembled monolayers on a particular gold electrode in the presence of another nearby electrode. Self-assembled monolayers were prepared by electrolysis of alkylthiosulfates in THF in the presence of tetrabutylammonium tetrafluoroborate as the supporting electrolyte. The tetrafluoroborate ion was found to inhibit the spontaneous chemisorption of alkylthiosulfate onto gold, and thus SAMs only formed when a sufficiently anodic potential was applied. Cyclic voltammetry produced ordered monolayers, as long as the limiting upper voltage was not greater than 1.3 V. Likewise, potentiometric pulses could also be used to produce complete monolayers selectively in the presence of tetrafluoroborate ion. The degree of completeness of the resulting monolayers depended on the potential and number of pulses applied. A partial monolayer was formed when pulses to low potential were applied, and this result is attributed to an insufficient driving force for ion migration and/or electron tunneling through a partial film. At optimum potentials, however, a monolayer can be formed using only 5 pulses (less than 1 min). Use of a higher potential (e.g., 1.6 V) gave monolayers with low coverage due to oxidation of the gold, the SAM, or the solvent. The dependence of optimum potential upon alkyl chain length is consistent with the ion migration and/or electron tunneling hypothesis.

Spectroscopic evidence using both XPS and FT-IR indicated a byproduct of this process, that insoluble in THF, was a sulfate salt. Specifically, sulfur 2p photoemission in the XPS spectrum of SAMs that had been rinsed with only THF indicated the presence of both thiolate (monolayer) and sulfate (side-product) sulfur. An infrared spectrum of the product in a bulk electrolysis confirmed this assignment. These results are consistent with the mechanism in FIG. 1.

The monolayers produced are very similar in thickness, wettability, blocking of heterogeneous electron transfer, and elemental composition to analogous SAMs formed by the chemisorption of alkanethiols. The selectivity of this synthetic method should allow the preparation of microelectrode arrays having differentiated surface chemistry, a goal of great importance in the fabrication of sophisticated sensor arrays. [32–33] Other attractive features of this electrosynthesis of SAMs are: i) the control it provides over the degree of coverage; ii) the short time necessary to form a SAM (less than a minute); iii) the ability to form SAMs easily on electrodes that are not clean; and iv) the use of precursors that lack an unpleasant odor (for alkyl groups containing more than about 10 carbons). The use of alkylthiosulfates, rather than thiols or thiolates, as precursors avoids the risk of thiolate (solution)/thiolate (SAM) exchange that could prevent or complicate formation of a SAM on one electrode without contaminating a different SAM already in place on another.

EXAMPLES

Example 1
Materials Used in Some of the Methods of the Invention

Hexadecanethiol (Aldrich, 92%) was purified by distillation under vacuum prior to use. Tetrabutylammonium hexafluorophosphate (98%), tetrabutylammonium perchlorate (99%), lithium perchlorate (95+%), sodium hydrogen sulfate (technical grade), 1-bromohexadecane (97%), 1-bromotetradecane (97%), 1-bromododecane (96%), 1-bromodecane (98%), 1-bromooctane (99%), potassium ferricyanide (99%), potassium ferrocyanide (99%), Rhodamine–6G (99%), and sodium thiosulfate pentahydrate (99.5%) were obtained from Aldrich and used as received. Ferrocene (dicyclopentadienyliron, 98%) was obtained from Alfa and used as received. Absolute ethanol (McCormick Distilling Co), sodium sulfate (EM Science, 99%), and silver nitrate (Kodak, 99.9%) were used as received. The hexadecane (Aldrich, 99%) used in the contact-angle measurements was purified by percolation twice through activated alumina. Tetrahydofuran (EM science, 99.94%) was distilled from sodium-benzophenone ketyl before use. Gold (99.99%) was obtained from Refining System Co and used as received. The epoxy, Epoxi-Patch, was from Dexter Corporation and used as received. Pump oil used in the "dirty gold" experiment was from VWR Scientific (vacuum pump oil No. 19) and used as received. All water used in this work was purified with a Milli-Pore Milli-Q system to a resistivity of at least 15 MΩ-cm.

Preparation of Sodium Alkylthiosulfates, $CH_3(CH_2)_nS_2O_3Na$ (n=7, 9, 11, 13, 15)

The Bunte salts were prepared following a literature procedure. [17] For example, 1-bromohexadecane (1.53 g, 5 mmol) dissolved in 20 mL of ethanol was added to a solution of sodium thiosulfate (1.24 g, 5 mmol) in 20 mL of water, and the mixture was brought to reflux until the solution became homogeneous. The solution was then cooled to room temperature, allowing the n-hexadecylthiosulfate to precipitate. The white solid was filtered and recrystallized using ethanol. $^1$H NMR: $CH_3(CH_2)_{15}SSO_3Na$, 0.86, (t, 3H); $CH_3(CH_2)_{13}CH_2SSO_3Na$, 1.31–1.50, (m, 26H); $CH_3(CH_2)_{14}CH_2SSO_3Na$, 1.65, (doublet-triplet, 2H); $CH_3(CH_2)_{13}CH_2CH_2SSO_3Na$, 2.66, (t, 2H).

Electrochemistry

The electrochemistry experiments were carried out using Bioanalytical Systems BAS-100B or EG & G Potentiostat/Galvanostat Model 273 from Princeton Applied Research. A conventional three-electrode configuration is equipped. In all cases, the gold coated on glass was the working electrode, a platinum flag (7 mm×20 mm) was the counter electrode, and a glass tube with a Vycor tip containing $Ag/AgNO_3$ (3 mM) [31] in acetonitrile plus 0.1 M $Bu_4NBF_4$ which was freshly prepared prior to experiments was the reference electrode. This reference electrode was checked against the $Fe(CN)_6^{3-}/Fe(CN)_6^{4-}$ redox couple prior to these experiments. All the cyclic voltammograms reported in this paper started with a scan in the anodic direction from –0.90 V and were collected at 100 mV/s in the presence of 0.1 M $Bu_4NBF_4$ as a supporting electrolyte.

Sample Preparation

Glass microscope slides were treated with (3-mercaptopropyl)trimethoxysilane according to a published procedure to act as an adhesion promoter for a gold overlayer. [34] Gold films were then deposited by thermal evaporation of the metal at ~0.5 Å/s at a background pressure of approximately $2\times10^{-6}$ Torr, to a final thickness of about 1000 Å. The gold electrode was placed into 10 mM sodium alkylthiosulfate with 0.10 mM $(Bu)_4NBF_4$ in THF. The potential was stepped from –0.90 V to 1.20 V for 5 s and then stepped back to the –0.90 V resting potential for 5 times for sodium n-hexadecylthiosulfate. The working potentials for the tetradecyl and dodecyl analogues were set at 1.10 V and 1.00 V, respectively, while the resting potential was kept at –0.90 V. The substrate was then rinsed with THF and absolute ethanol and dried with a stream of $N_2$.

X-ray Photoelectron Spectroscopy

The XPS spectra disclosed herein were obtained using a Scienta ESCA300 spectrometer, equipped with a rotating anode (Al Kα) source producing approximately 39.0 kW of X-ray power, a monochromator, and a 300-mm (diameter) hemispherical analyzer. All spectra were collected at a 20° take-off angle between the plane of the surface and the detector, a slit width of 11 mm, and were referenced to the Au 4 $f_{7/2}$ peak set at 84.0 eV. The background pressure in the sample chamber was $2\times10^{-9}$ Torr. Survey scans were collected with a pass energy of 75 eV and a step energy of 1.0 eV, and took 5.5 min to complete. Sulfur 2 p regional scans were collected with a pass energy of 150 eV and a step energy of 0.05 eV, and took 10 min to complete (5 scans). Carbon 1 s regional scans were collected with a pass energy of 150 eV and a step energy of 0.05 eV, and took 4.5 min to complete (2 scans). Gold 4 $f_{7/2}$ regional scans were collected with a pass energy of 75 eV and a step energy of 0.2 eV, and took 1 min to complete (single scan). Oxygen 1s regional scans were collected with a pass energy of 150 eV and a step energy of 0.05 eV, and took 6 min to complete (3 scans). Sodium is regional scans were collected with a pass energy of 150 eV and a step energy of 0.05 eV, and took 6.5 min to complete (5 scans).

For quantitative analysis, the sensitivity factors used to correct the number of counts under each peak (or envelope) were: Au 4 $f_{7/2}$, 9.58; C 1 s, 1.000; O 1 s, 2.8370; S 2 p (both components), 2.1735; and Na 1 s, 8.520. The sensitivity factors for oxygen, carbon, and sulfur, and sodium photoemission were determined by A. C. Miller with the Scienta ESCA-300 at Lehigh University. The value for gold is the Scofield value. [35] The curve fitting was performed using Scienta ESCA system software [36] following a published procedure: [37] Each peak is described as a sum of Gaussian and Lorentzian functions, assuming a linear baseline. For C 1 s photoemission, all fits had reasonable mixing (m≧0.85) and asymmetry (A≦0.12) ratios, as well as acceptable line widths (1.00–1.25 eV, fwhm). For Au 4 $f_{5/2}$ photoemission, all fits had reasonable mixing (m≧0.70) and asymmetry (A≦0.14) ratios with line width between 0.65–0.68 eV (fwhm). For S 1 s photoemission, all fits had mixing (≧0.60) and asymmetry (≦0.21) ratios, as well as acceptable line widths (0.60–0.860 eV, fwhm). For Na 1 s photoemission, the fwhm was 1.79 eV, with an asymmetry ratio of 0.012, and mixing ratio of 1. For O 1 s photoemission, the fwhm was 1.39 eV, with an asymmetry ratio of 0.14, and mixing ratio of 1.

Contact Angle and Ellipsometry Measurements

Advancing contact angle measurements of hexadecane and water were measured using a Rame-Hart NRL Model 100 goniometer. A minimum of six measurements on three independent drops were made for each sample. Ellipsometric measurements were made using an automatic null ellipsometer (Rudolph Auto-EL III) equipped with helium-neon laser (λ=632.8 nm) set at a 70° incident angle, employing the manufacturer's program. Measurements were collected from four arbitrarily chosen spots on the samples. Calculations of film thickness typically assumed a refractive index of monolayer is 1.5.

Infrared Spectroscopy

Infrared spectra were collected using a Perkin-Elmer FT-IR 1600 spectrometer, at a resolution of 2 cm$^{-1}$. In each case, 64 scans were averaged to achieve a satisfactory signal-to-noise ratio.

GC-MS and NMR

The masses of sufficiently volatile products were confirmed using a Hewlett Packard 5890 Series II Gas Chromatography, equipped with Hewlett Packard 5972 series Mass Selective detector. $^{1}$H NMR spectra were acquired using a Bruker AMX 360 spectrometer, referenced to CHCl$_3$ at 7.24 ppm and are reported in units of δ.

Fluorescence Microscopy

The fluorescence microscopy was done using a Nikon Microflex UFX-II, Nikon Biological Microscope OPTIPHOT equipped with Nikon FX-35A camera. The magnification in this experiment was 100×. A red filter was used when the pictures were taken. Rhodamine-6G (1.06 mM) in water was used as the dye solution.

Example 2

Oxidation of Alkylthiosulfates

Figure 2:
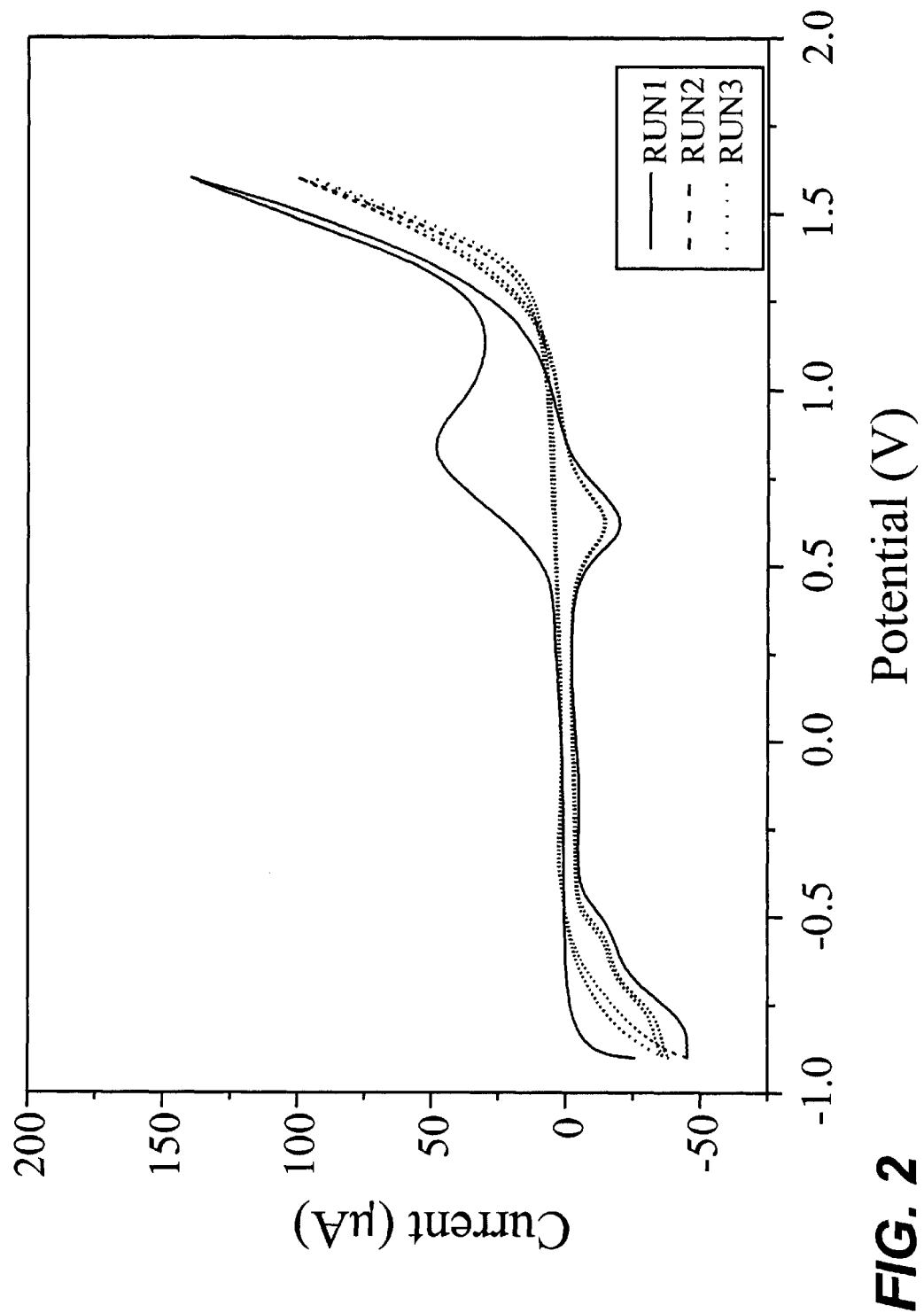
FIG. 2 shows cyclic voltammograms for a 10 mM solution of sodium n-hexadecylthiosulfate in THF from −0.9 to 1.6 V (0.1 M $LiClO_4$, 100 mV/s) using a gold working electrode and a $Ag/AgNO_3$ reference electrode (3 mM in $CH_3CN$).
Figure 3:
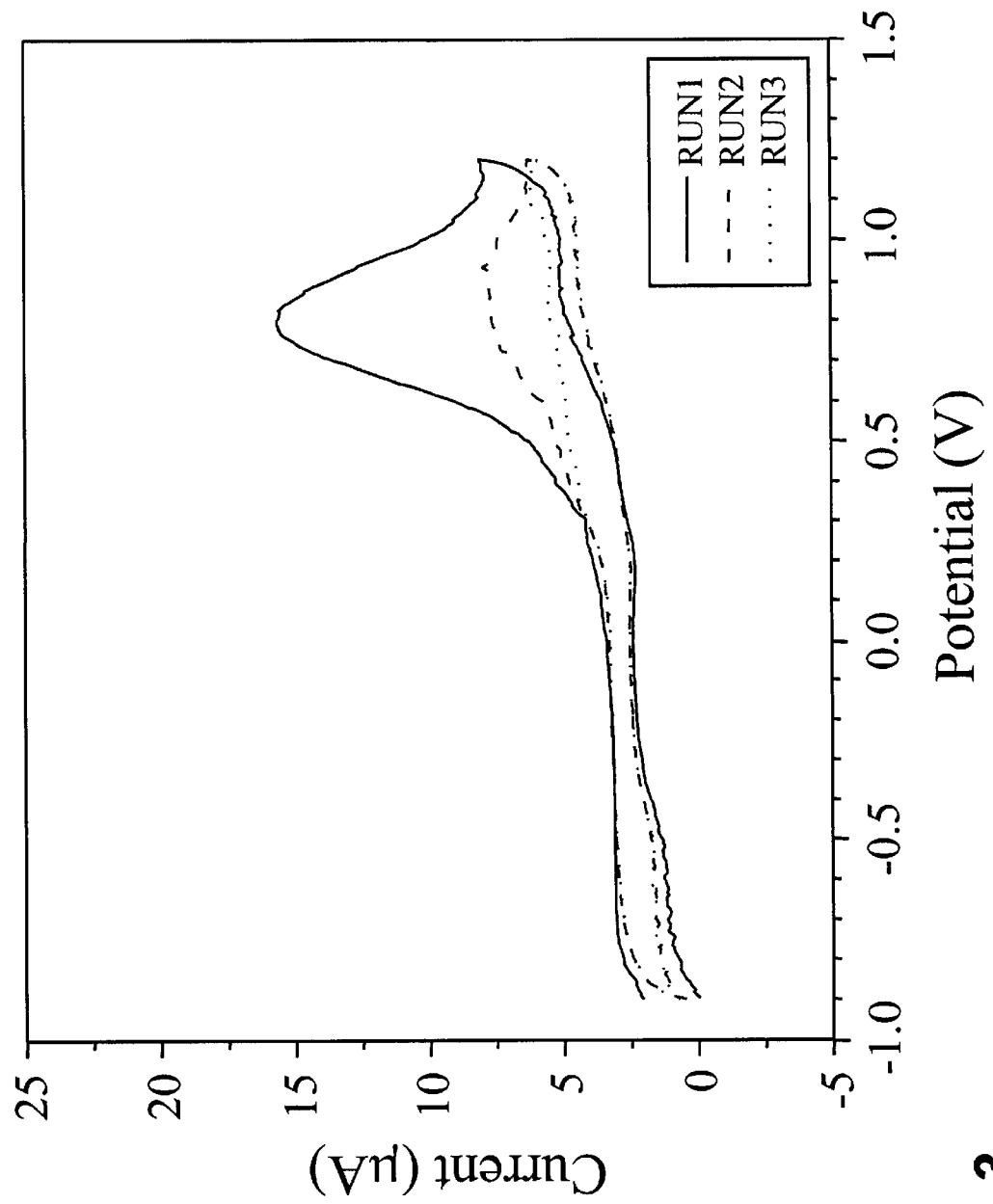
FIG. 3 shows cyclic voltammograms for a 10 mM solution of sodium n-hexadecylthiosulfate in THF from −0.9 to 1.2 V (0.1 M $LiClO_4$, 100 mV/s) using a gold working electrode and a $Ag/AgNO_3$ reference electrode (3 mM in $CH_3CN$).

Alkylthiosulfates, CH$_3$(CH$_2$)$_n$S$_2$O$_3$Na (n=15, 13, 11, 9, and 7) were synthesized by nucleophilic displacement reactions between sodium thiosulfate and the corresponding alkyl bromides, and purified by recrystallization in ethanol, according to a reported procedure. [17] Our initial studies of the electrochemistry of these alkylthiosulfates were carried out using cyclic voltammetry in various solvents, e.g. acetonitrile, water, ethanol, and ethanol/water (50:50), but oxidation was only observed in the THF. Different supporting electrolytes were also used, with widely varying results. For example, the cyclic voltammogram (−0.9 V to 1.6 V) of n-hexadecylthiosulfate in THF using LiClO$_4$ as the supporting electrolyte contained an oxidation peak at 0.95 V in the first anodic scan, which then decreased significantly in the following scans (FIG. 2). The sample became more hydrophobic after 3 cycles, but an ordered monolayer did not form: contact angles of hexadecane on the surface after 200 scans (16–18°) indicated that the monolayer was incomplete. Cycling to a lower potential (1.2 V) did produce a nearly complete monolayer with contact angles of hexadecane of 42–44° (FIG. 3). Control experiments, however, suggested that formation of this monolayer could have been due primarily to the spontaneous chemisorption of n-hexadecylthiosulfate, rather than to the electrochemical process (vide infra). Nonetheless, cycling to the low positive potential in these experiments apparently avoided the oxidative desorption found at potentials approaching ~1.6 V.

Figure 4:
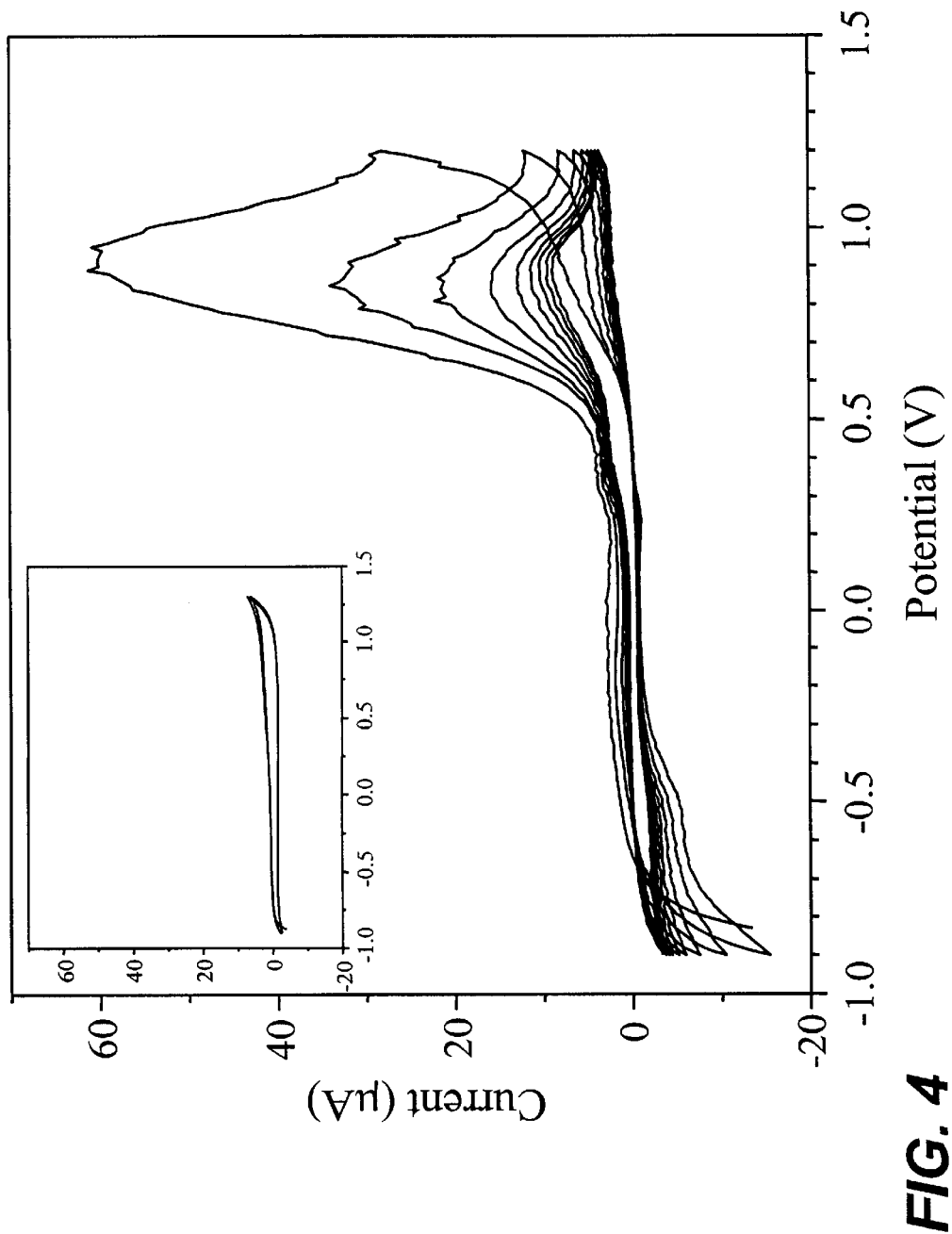
FIG. 4 shows cyclic voltammograms for a 10 mM solution of sodium n-hexadecylthiosulfate in THF (0.1 M $Bu_4NBF_4$, 100 mV/s) using a gold working electrode and a $Ag/AgNO_3$ reference electrode (3 mM in $CH_3CN$). The inset figure shows a cyclic voltammogram for a bare gold electrode in THF (0.1 M $Bu_4NBF_4$, 100 mV/s) using a $Ag/AgNO_3$ reference electrode.

In contrast, the voltammogram of n-hexadecylthiosulfate in THF with 0.1 M Bu4NBF4 as the supporting electrolyte contained a large oxidation peak in the first anodic scan, which decreased only gradually in subsequent scans (FIG. 4). The current rose sharply and reached a maximum at approximately 0.95 V before decreasing again, consistent with a decrease in the concentration of Bunte salt near the gold electrode or blocking of the electrode by the resulting monolayer at the gold surface. The peak current due to oxidation of Bunte salt gradually decreased in each successive scan until about the sixth scan, after which it remained unchanged. This decrease in current in each successive scan was likely due to the decrease of free gold surface after each scan, arising from chemisorption of the SAM.

Example 3

Electrochemical Formation of Ordered Monolayers

Figure 5:
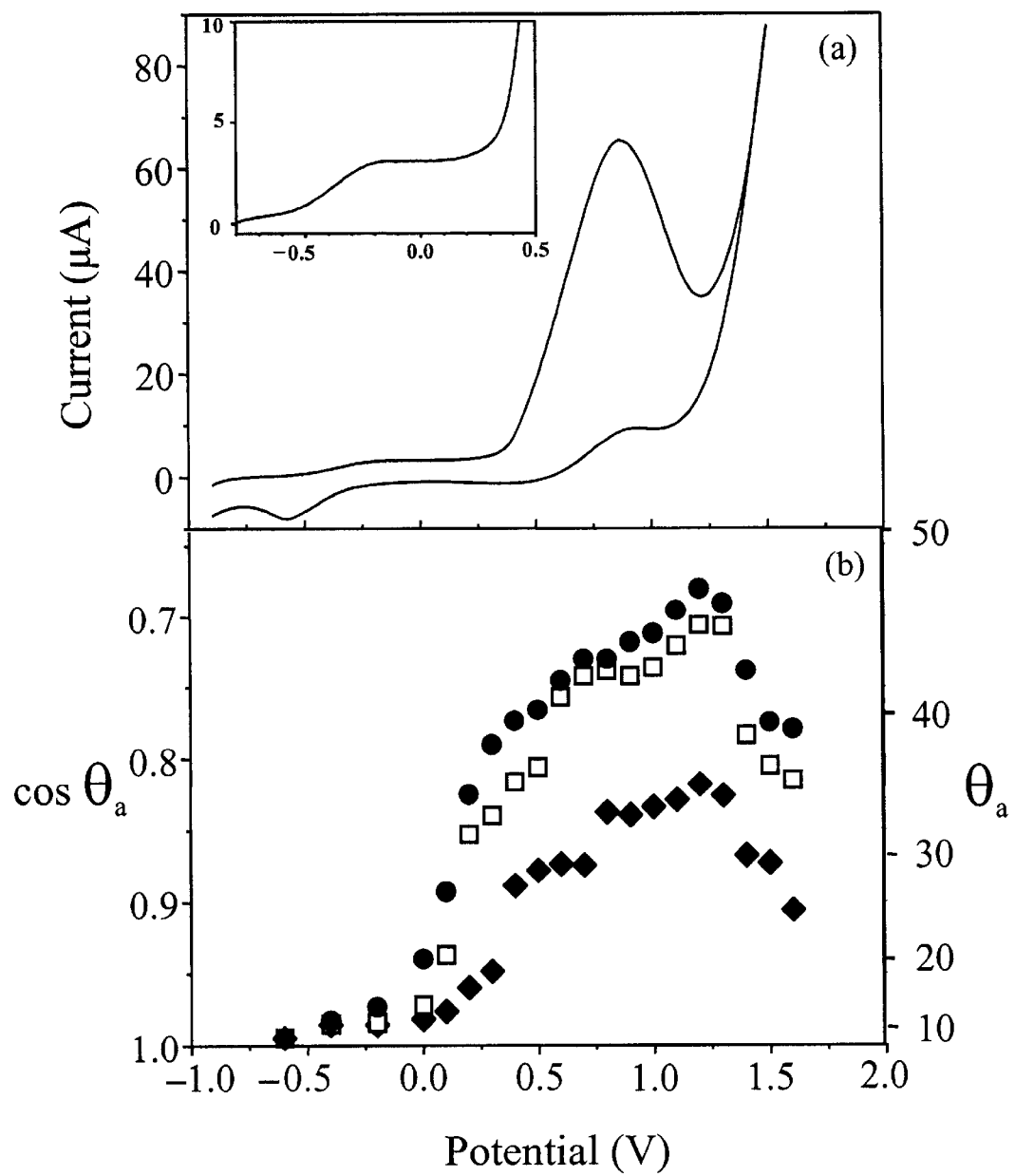
FIG. 5 shows a cyclic voltammogram (top) for a 10 mM solution of sodium n-hexadecylthiosulfate in THF (0.1 M $Bu_4NBF_4$) using a gold working electrode and a $Ag/AgNO_3$ (3 mM in $CH_3CN$) reference electrode. The inset figure shows the onset of current flow in the anodic scan. The bottom plot shows the advancing contact angles of hexadecane on SAMs formed by electrochemical oxidation of n-hexadecylthiosulfate using 1 (●), 3 (□), and 5 (♦) voltametric pulses to different potentials.

As with LiClO$_4$, cycling to 1.6 V with Bu$_4$NBF$_4$ as the supporting electrolyte did not produce ordered SAMs. A monolayer formed in this way, using even 200 scans, had a contact angle of hexadecane of only 30°. For comparison, monolayers formed by chemisorption of n-hexadecanethiol gave contact angles of hexadecane of 44 to 46°. Cycling to lower potential (from −0.9 V to 1.2 V or −0.9 V to 1.3 V) for 8 scans, however, did produce ordered monolayers with contact angles of hexadecane of 45–46°. FIG. 5a shows a cyclic voltammogram for a gold electrode immersed in a 10 mM solution of sodium n-hexadecylthiosulfate in THF, with 0.1 M Bu$_4$NBF$_4$ as a supporting electrolyte and an Ag/AgNO$_3$ (3 mM in CH$_3$CN) reference electrode. The figure inset magnifies this voltammogram in the range of potential from −0.80 to +0.50 V in the anodic scan and clearly displays the onset of current flow at about −0.60 V. The current rose to a small steady-state value at potentials between approximately −0.20 and +0.20 V, after which it rose sharply into the main voltametric peak (E$_{p,a}$+0.85 V).

Because the return wave in cyclic voltammetry was not necessary to build SAMs, simpler potentiometric "pulses" were used to assess the ability to form SAMs electrochemically. Potential pulses were used within the range of potential giving measurable anodic current to assess the ability to form SAMs electrochemically and to minimize any oxidative degradation or disordering of the resulting monolayer (FIG. 5b). In these experiments, a gold electrode was immersed into the sodium n-hexadecylthiosulfate solution (THF, 0.1 M Bu$_4$NBF$_4$), and its potential was then stepped from −0.90 V (again, vs. Ag/AgNO$_3$) to a particular value in the range producing anodic current in the cyclic voltammogram. It was held at this potential for 5 s and then stepped back to the −0.90 V resting potential. This process was repeated using a separate sample for each potential from −0.60 to +1.60 V, in 0.10-V increments. The advancing contact angle of hexadecane provided a convenient measure of the degree of completeness of the resulting monolayer films as a function of the applied potential used in their formation. FIG. 5b shows these data for samples prepared using 1, 3, or 5 pulses to specific potentials. In all cases, the onset of anodic current at approximately −0.50 V corresponded closely to the appearance of a finite contact angle of hexadecane on the film produced. The contact angle increased with increasing applied potential, up to about 1.20 V, above which the contact angle began to decrease. The peak contact angles (45–47°) compared favorably with those reported for complete, well-ordered SAMs prepared by the self-assembly of hexadecanethiol. [2] The degradation in oleophobicity at high potential corresponded to a strong anodic current (FIG. 5a), probably reflecting oxidation of the gold electrode or of THF and concomitant disordering of the films. These results were important because they defined the range of potential that would be useful for the synthesis of SAMs.

Figure 6:
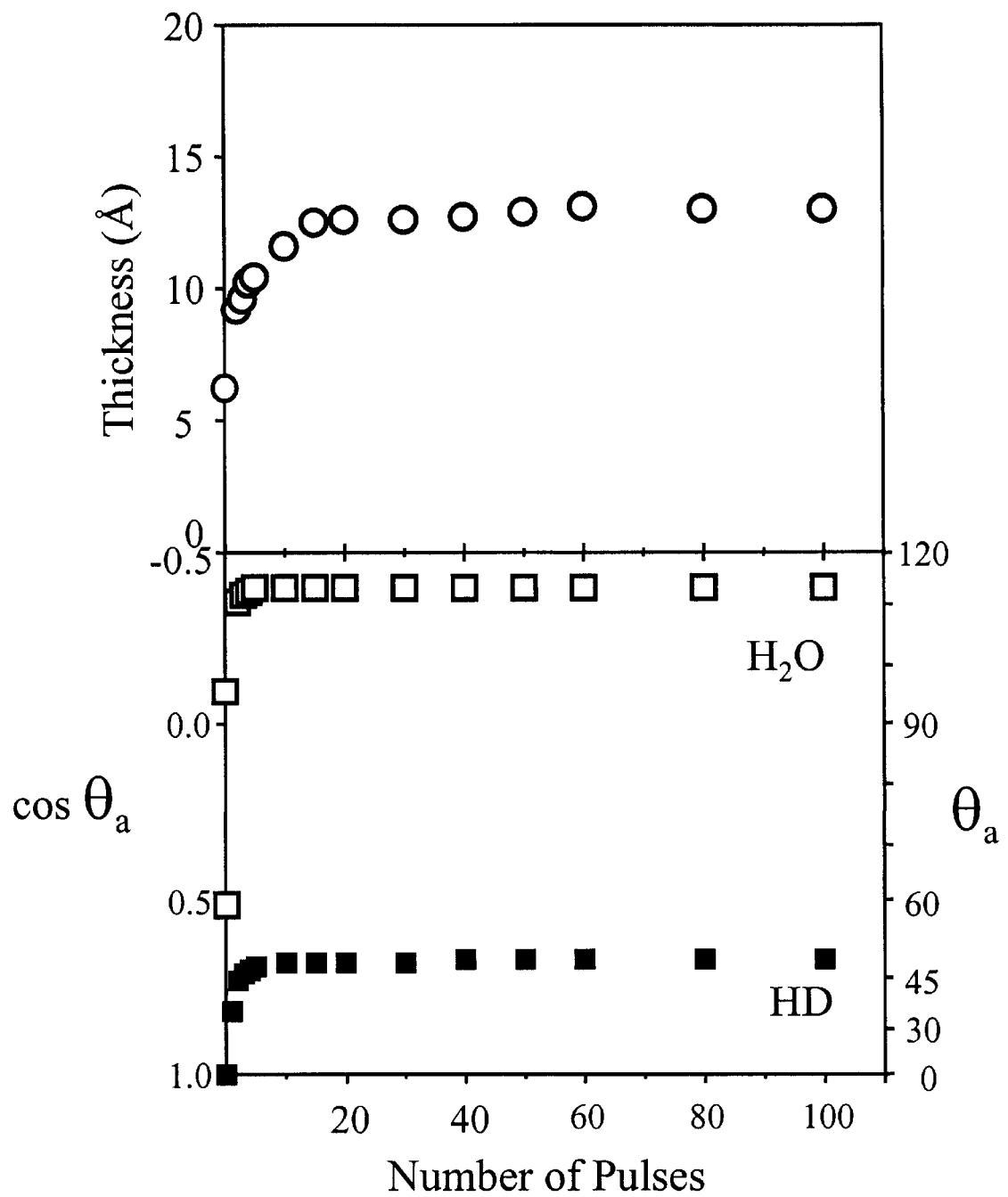
FIG. 6 depicts the ellipsometric thickness (top) and advancing contact angles of water and of hexadecane (bottom) on a gold electrode as a function of the number of potential pulses to 1.20 V (vs. $Ag/AgNO_3$) in a 10 mM solution of sodium n-hexadecylthiosulfate in THF (0.1M $Bu_4NBF_4$).

The monolayers in FIG. 5b formed by 5 pulses gave slightly higher contact angles than those formed by 3 pulses; monolayers formed by a single pulse gave much lower contact angles, indicating less complete formation. The growth of these films was followed systematically, as a function of the number of potentiometric pulses, by monitoring the thickness and wettability of monolayers formed by electrolysis of n-hexadecylthiosulfate at 1.20 V. These experiments utilized a single electrode, whose surface was characterized after each pulse or series of pulses. As the number of pulses was increased, the contact angles of both water and hexadecane rose as shown in FIG. 6 (bottom), and reached limiting values consistent with a well-ordered monolayer (H$_2$O, 112–114°; hexadecane, 45–47°). [2] The ellipsometric thickness of the monolayer also increased as a function of the number of pulses to approximately 13 Å, consistent with the length of the alkyl chain of the adsorbate if some contamination was removed from the surface of the gold during the electro-chemisorption (FIG. 6, top) [2], or with a small amount of free volume in the product film. For comparison, a monolayer formed at the same time by self-assembly of hexadecanethiol gave the same thickness.

Figure 7:
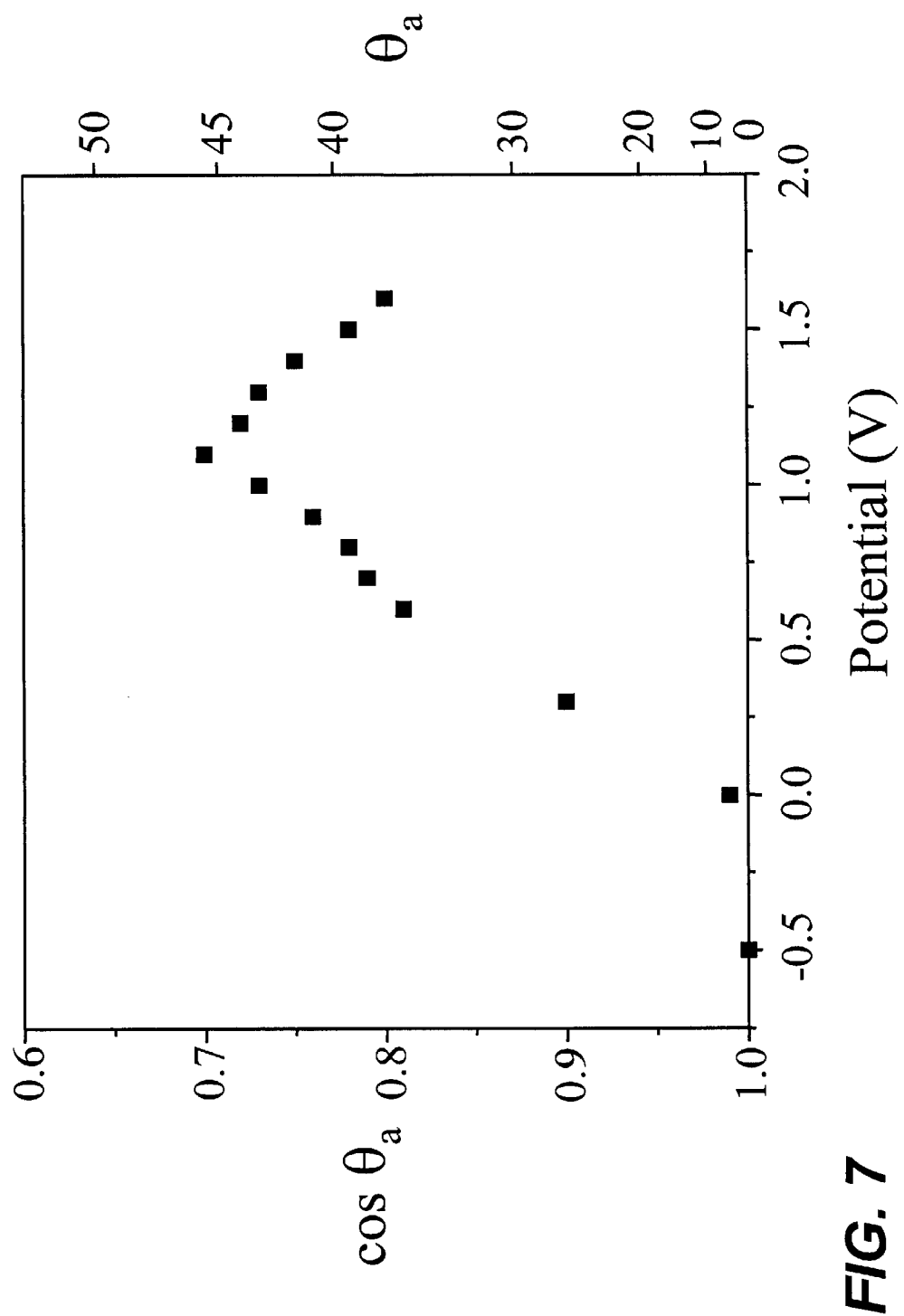
FIG. 7 shows the advancing contact angles of hexadecane on SAMs formed by electrochemical oxidation of n-tetradecylthiosulfate using five voltametric pulses to various potentials.

Also prepared were SAMs of tetradecanethiolate by oxidizing sodium n-tetradecylthiosulfate. In these experiments, a gold electrode was immersed into a solution (THF, 0.1 M Bu$_4$NBF$_4$) of sodium n-tetradecylthiosulfate, and the potential was stepped from a resting value of −0.90 V (vs. Ag/AgNO$_3$) to a particular value in the range producing anodic current in the cyclic voltammogram. The gold electrode was held at this potential for 5 s and then stepped back to the −0.90 V resting potential for 5 s. To optimize the procedure for synthesizing SAMs, this process was repeated 5 times using a separate sample for each potential from −0.50 to 1.60 V in 0.1-V increments. The degree of completeness of each resulting monolayer was assessed by measuring the advancing contact angles of hexadecane on its surface as shown in FIG. 7. The contact angles increased with increasing applied potential, up to about 1.10 V, above which the contact angles began to decrease. The maximum contact angles (45–46°) agreed with those reported for complete, well-ordered SAMs prepared by the chemisorption of n-tetradecanethiol (44–46°). [2]

Figure 8:
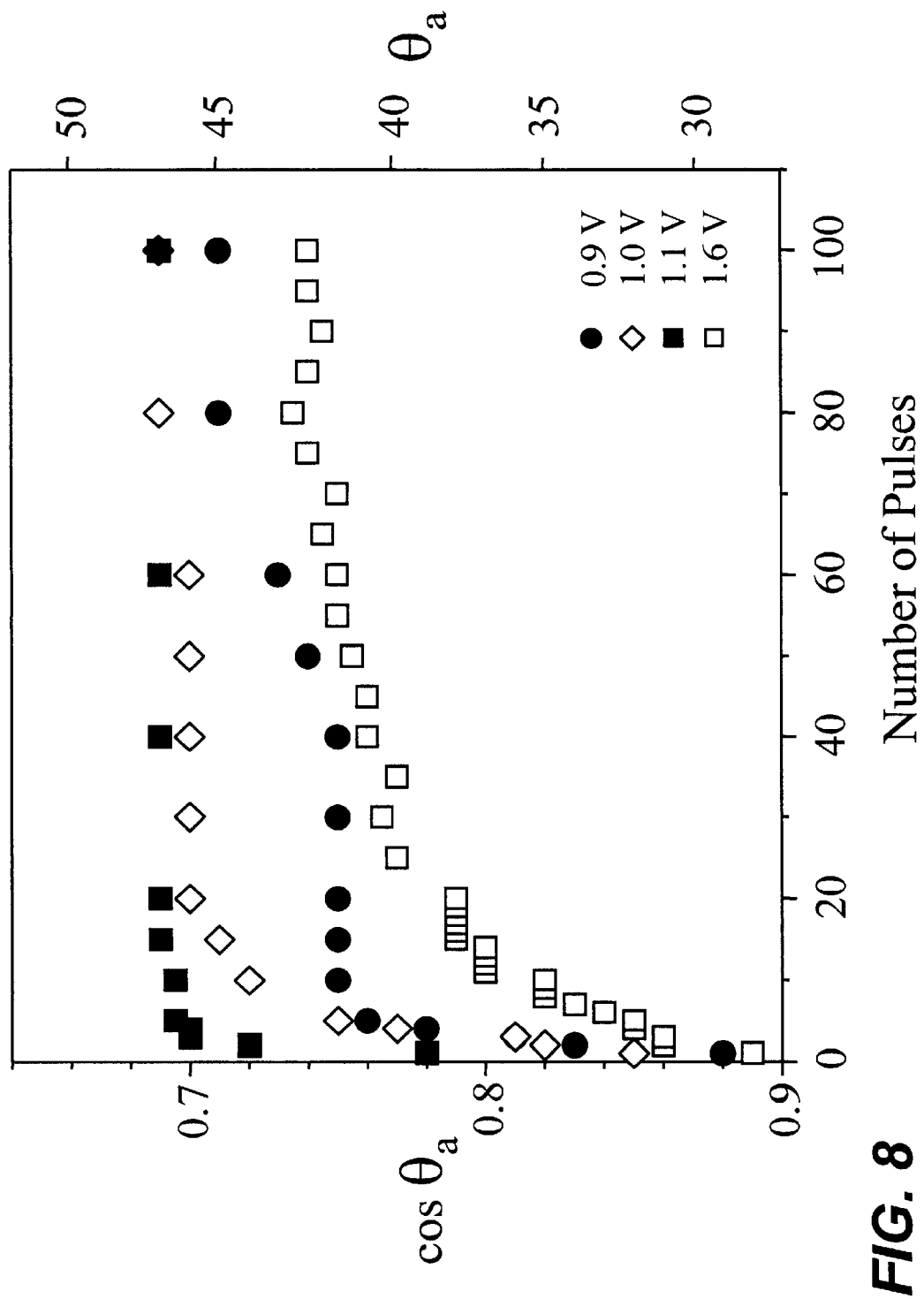
FIG. 8 shows the advancing contact angles of hexadecane on SAMs formed by electrochemical oxidation of n-tetradecylthiosulfate as a function of the number of voltametric pulses to 0.90 (●), 1.00 (◇), 1.10 (■) or 1.60 (□) V.

The growth of these films was also followed systematically, as a function of the number of potentiometric pulses to a given potential by monitoring wettability by hexadecane on monolayers formed by electrolysis of n-tetradecylthiosulfate. FIG. 8 shows these data for SAMs generated with from 1 to 100 pulses to 0.90, 1.00, 1.10, and 1.60 V. Using 0.90 V as the working potential, the contact angles of hexadecane on gold rose from 0 to 42° in the first ten pulses and then increased slowly to 45° after 100 cycles. With 1.00 V as the working potential, the contact angles of hexadecane reached 44° after 10 pulses and leveling off at 46° after 20 pulses. The optimum working potential for n-tetradecylthiosulfates, however, was 1.10 V, giving a SAM with a hexadecane contact angles of 44° after only 3 pulses, and quickly levelling off at 46° after only 5 cycles. Consistent with our results from cyclic voltammetry, using potentials higher than this optimum value gave incomplete monolayers. For example, pulses to 1.60 V gave lower contact angles of hexadecane in the first 20 pulses, and did not produce a monolayer with satisfactory contact angles (45–46°) after even 100 pulses.

The optimum potential to produce complete SAMs, judged by contact angles of hexadecane, varied as a function of the length of the alkyl chain of the alkylthiosulfates. We formed high quality SAMs from n-dodecylthiosulfates at 1.00 V, n-tetradecylthiosulfate at 1.10 V, and from n-hexadecylthiosulfate at 1.20 V. These data are consistent with ion migration and/or electron tunneling being important as these SAMs approach completion and explain why more complete SAMs are formed at higher potentials, up to the point were oxidation of the gold becomes a problem. [24] At a partially completed SAM, a potential slightly lower than the optimum potential, i.e. 1.00 V vs. 1.10 V, may not provide enough energy for an alkylthiosulfate ion to migrate, or for an electron to tunnel, through the film. Therefore, many more pluses were needed at 1.00 V than 1.10 V to get complete coverage. At even lower potential (e.g. 0.90 V), the monolayer only approached but did not reach completion. Potentials higher than 1.10 V resulted in oxidation of the gold, the SAM, or the solvent, with concomitant disordering of the monolayer.

Figure 9:
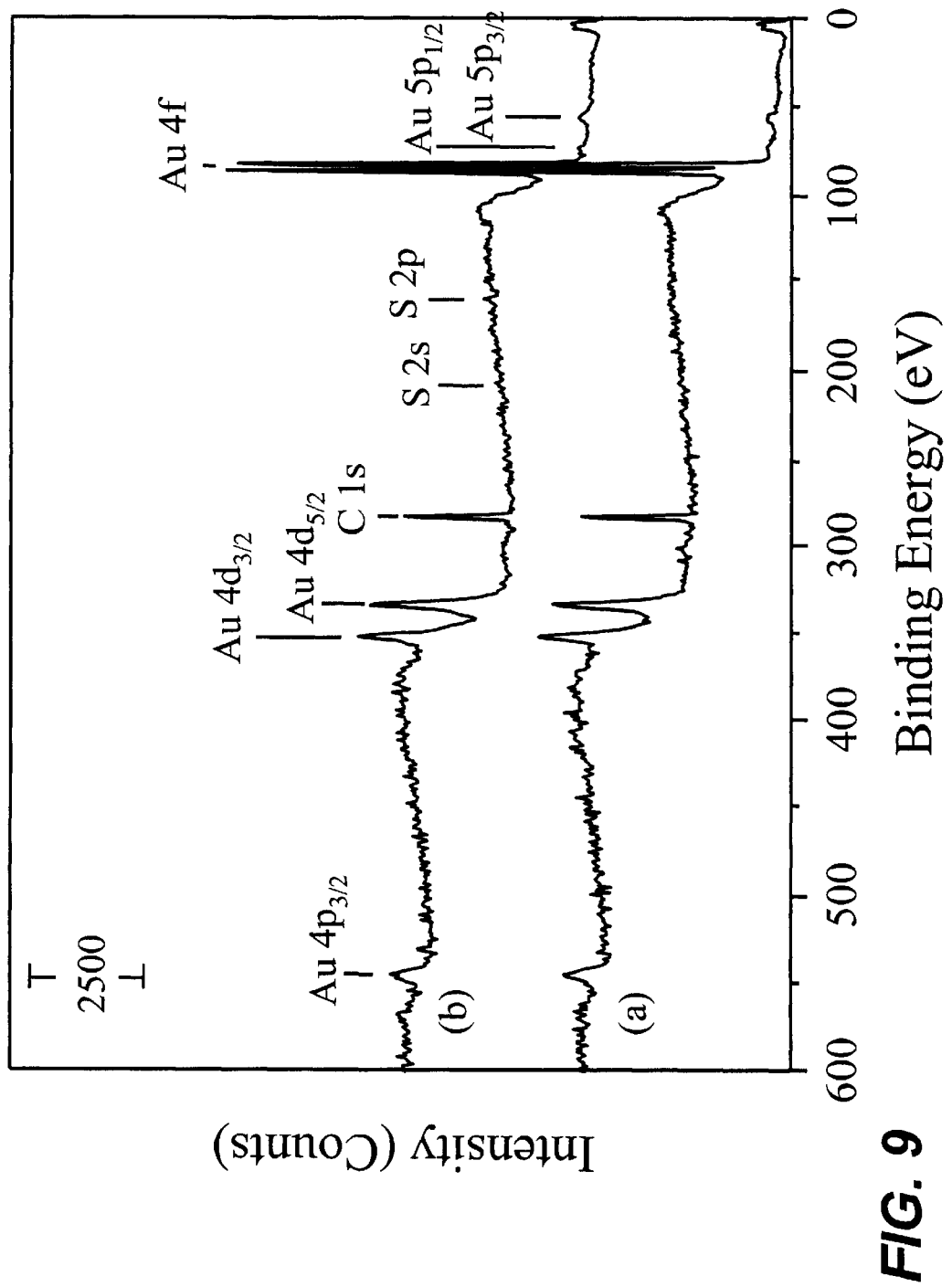
FIG. 9 is the X-ray photoelectron survey spectra of SAMs formed by (a) adsorption of n-hexadecanethiol and (b) electro-chemisorption of n-hexadecylthiosulfate.
Figure 10:
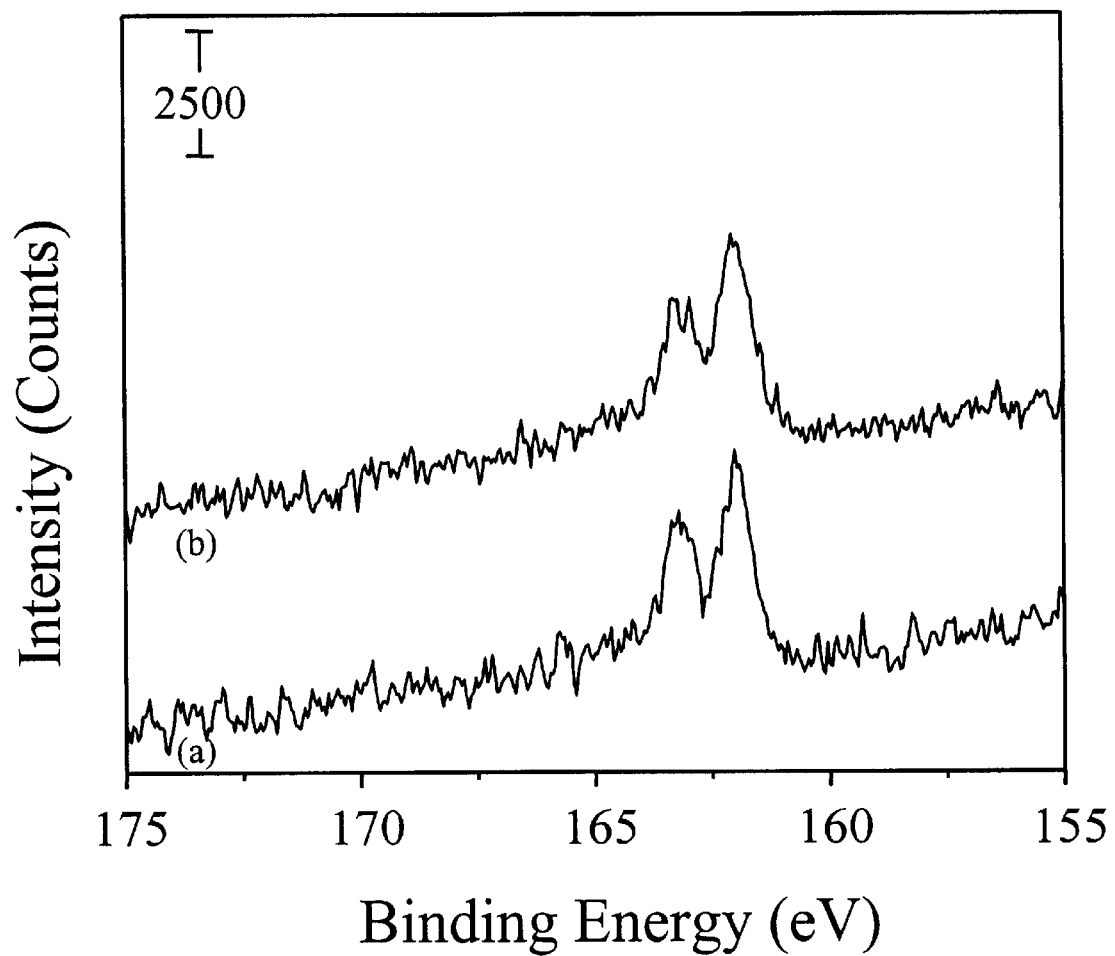
FIG. 10 shows the high-resolution X-ray photoelectron survey spectra in the sulfur 2p region of SAMs formed by (a) adsorption of n-hexadecanethiol and (b) by electro-chemisorption of n-hexadecylthiosulfate.

Chemical analysis by x-ray photoelectron spectroscopy of SAMs formed electrochemically revealed the presence of only carbon and sulfur, as thiolate, on the gold surface (FIG. 9). Survey spectra (20° take-off angle) of a monolayer formed by the electrolysis of n-hexadecylthiosulfate at 1.20 V (5 pulses) and of one formed by adsorption of n-hexadecanethiol from ethanol, shown in FIG. 9, are nearly indistinguishable. Furthermore, high-resolution spectra (FIG. 10, 20° take-off angle) of the same samples in the sulfur 2 p region showed that both samples contained only thiolate sulfur, with no evidence of higher oxidation states due either to incomplete reduction of the thiosulfate or to oxidation of the thiolate by air (FIG. 9, inset). [25] Likewise, the ratio of the integrated carbon (1 s) to gold (4 f$_{7/2}$) signals—a measure of the completeness of the monolayer— was very similar for the two types of monolayer (thiol, 3.0; thiosulfate, 2.8). These data were corrected for the different sensitivities of these elements and orbitals as well as for the number of scans. The take-off angles reported are between the detector and the plane of the surface.

Figure 11:
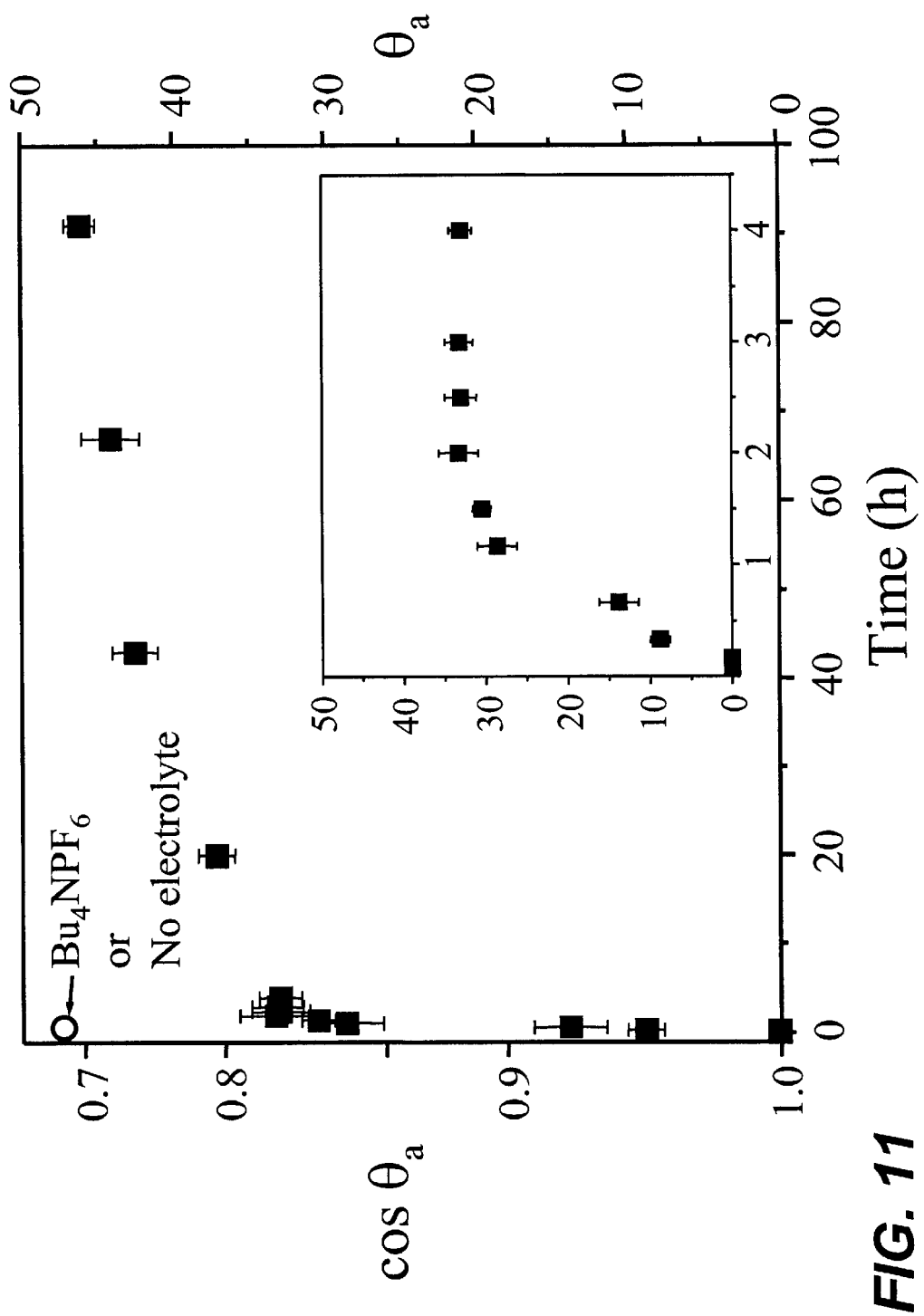
FIG. 11 shows the advancing contact angles of hexadecane ($\theta_a$) on a gold electrode as a function of the immersion time in a 10 mM solution of sodium n-hexadecylthiosulfate with (○) and without (■) 0.1 M $Bu_4NBF_4$. The inset figure shows the change in contact angles of hexadecane within the first 4 h.

Example 4
Spontaneous, Non-electrochemical Formation of SAMs from Bunte Salts In the absence of $Bu_4NBF_4$, or any basic species, a solution of n-hexadecylthiosulfate (10 mM in THF) formed complete a monolayer on gold spontaneously within 15 min, consistent with related observations by Lukkari and co-workers. [26] Thus, the selectivity of our approach depends on the ability of $Bu_4NBF_4$ to inhibit this spontaneous process in THF. In the presence of 0.1 M $Bu_4NBF_4$, it took 91 h to form an ordered monolayer by the spontaneous chemisorption of n-hexadecylthiosulfates in THF (FIG. 11). Table 1 shows the contact angles of hexadecane on gold surfaces after treatment with THF solutions of n-hexadecylthiosulfate for 15 min in the presence of various amount of $Bu_4NBF_4$.

TABLE 1

Contact Angles of Hexadecane on SAMs Formed by Spontaneous Chemisorption of n-Hexadecylthiosulfate. After 15 min in the Presence/Absence of Tetrabutylammonium Tetrafluoroborate.

| $[Bu_4NBF_4]/[C_{16}H_{33}S_2O_3Na]$ | 0 | 1 | 5 | 10 |
|---|---|---|---|---|
| $\theta_a$ | 46 | 42 | 16 | <10° |

As expected, low concentrations of $Bu_4NBF_4$ allowed monolayer formation to proceed to near completion within this time period, whereas higher concentrations significantly inhibited growth. Chemisorption was not inhibited, however, when tetrabutylammonium hexafluorophosphate ($Bu_4NPF_6$) or tetrabutylammonium perchlorate ($Bu_4NClO_4$) were used as the supporting electrolyte instead of $Bu_4NBF_4$, indicating that the tetrafluoroborate anion is responsible for inhibition of spontaneous chemisorption. One possible explanation may be the basicity of tetrafluoroborate in non-aqueous solvents such as THF, which could prevent acid hydrolysis of Bunte salt to produce thiol. In contrast, the presence of $Bu_4NBF_4$ (0.1 M in THF) did not appear to inhibit the formation of SAMs by chemisorption of n-hexadecanethiol (10 mM).

Example 5
Electrolysis of Bunte Salts at other Electrodes

Figure 12:
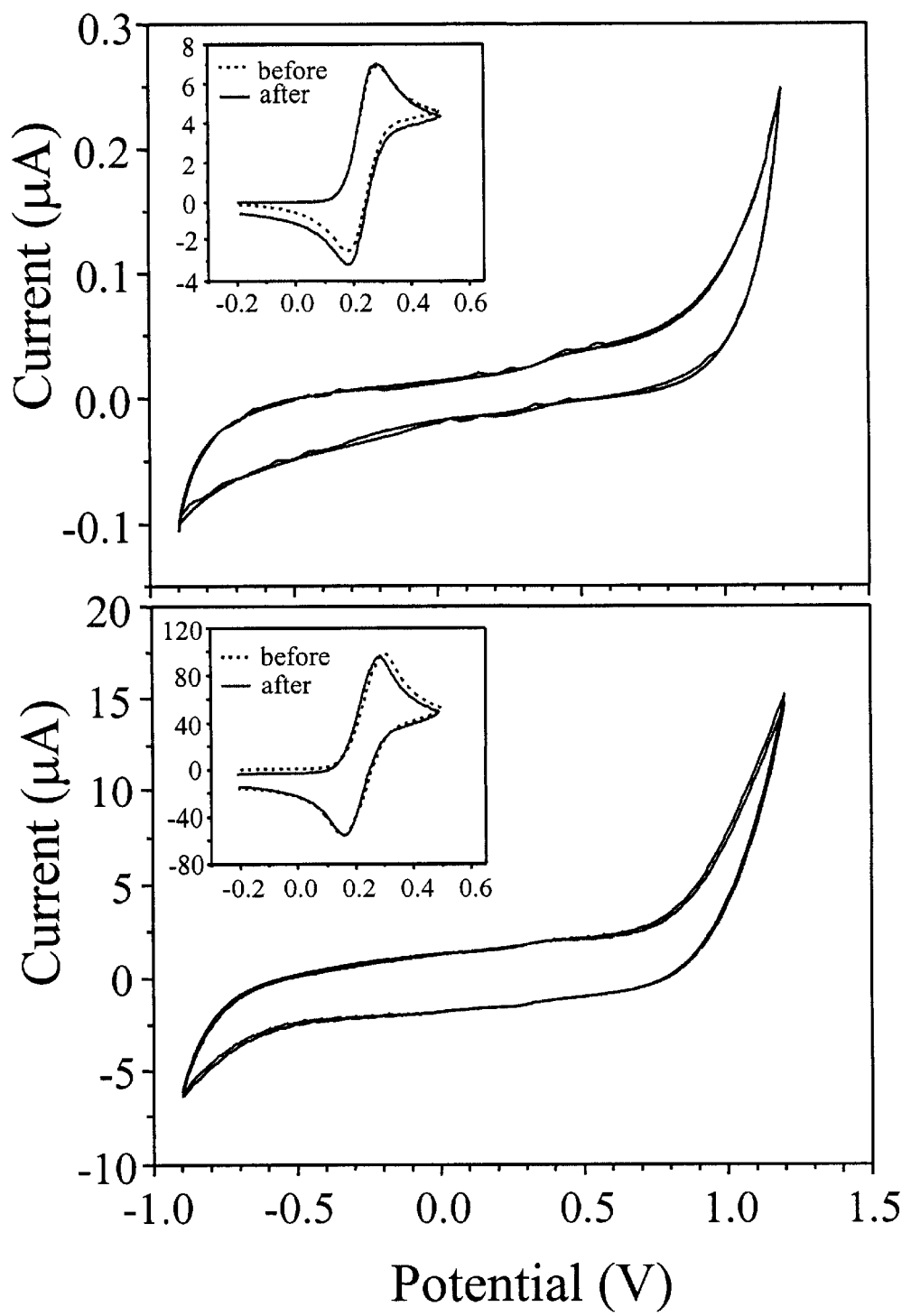
FIG. 12 shows (a) cyclic voltammograms for a 10 mM solution of sodium n-hexadecylthiosulfate in THF (0.1 M $Bu_4NBF_4$, 100 mV/s) using a graphite working electrode and a $Ag/AgNO_3$ reference electrode (3 mM in $CH_3CN$). The inset figure shows a cyclic voltammogram for a graphite electrode in the solution of 10 mM ferrocene in THF (0.1 M $Bu_4NBF_4$, 100 mV/s) before and after being used (Ag/$AgNO_3$ reference electrode). (b) Cyclic voltammograms for a 10 mM solution of sodium n-hexadecylthiosulfate in THF (0.1 M $Bu_4NBF_4$, 100 mV/s) using a platinum working electrode and a $Ag/AgNO_3$ reference electrode (3 mM in $CH_3CN$). The inset figure shows a cyclic voltammogram for a platinum electrode in the solution of 10 mM ferrocene in THF (0.1 M $Bu_4NBF_4$, 100 mV/s) before and after being used (Ag/$AgNO_3$ reference electrode).

When using platinum or graphite instead of gold as the working electrode (THF, 0.1 M $Bu_4NBF_4$), we did not observe oxidation attributable to the Bunte salt by cyclic voltammetry. FIG. 12 shows typical voltammograms for n-hexadecylthiosulfate (10 mM in THF, 0.1 M $Bu_4NBF_4$) using graphite and platinum as the working electrode, respectively. No oxidation peaks were observed at either electrode between −0.9 to 1.2 V. To rule out the possibility of electrode fouling during the cyclic scans, the electrodes were checked using ferrocene-ferricinium as a probe redox couple. Both electrodes showed normal electrochemical responses both before and after the Bunte-salt experiments (FIG. 12, insets). Interestingly, the bulk electrolysis of Bunte salts at platinum electrodes in acidic water (0.1 M $H_2SO_4$ or 0.5 M $NaHSO_4$) has been reported previously. [17] Our results clearly indicate the involvement of gold surface chemistry in the electrochemically directed self-assembly of Bunte salts to form monolayers.

Figure 13:
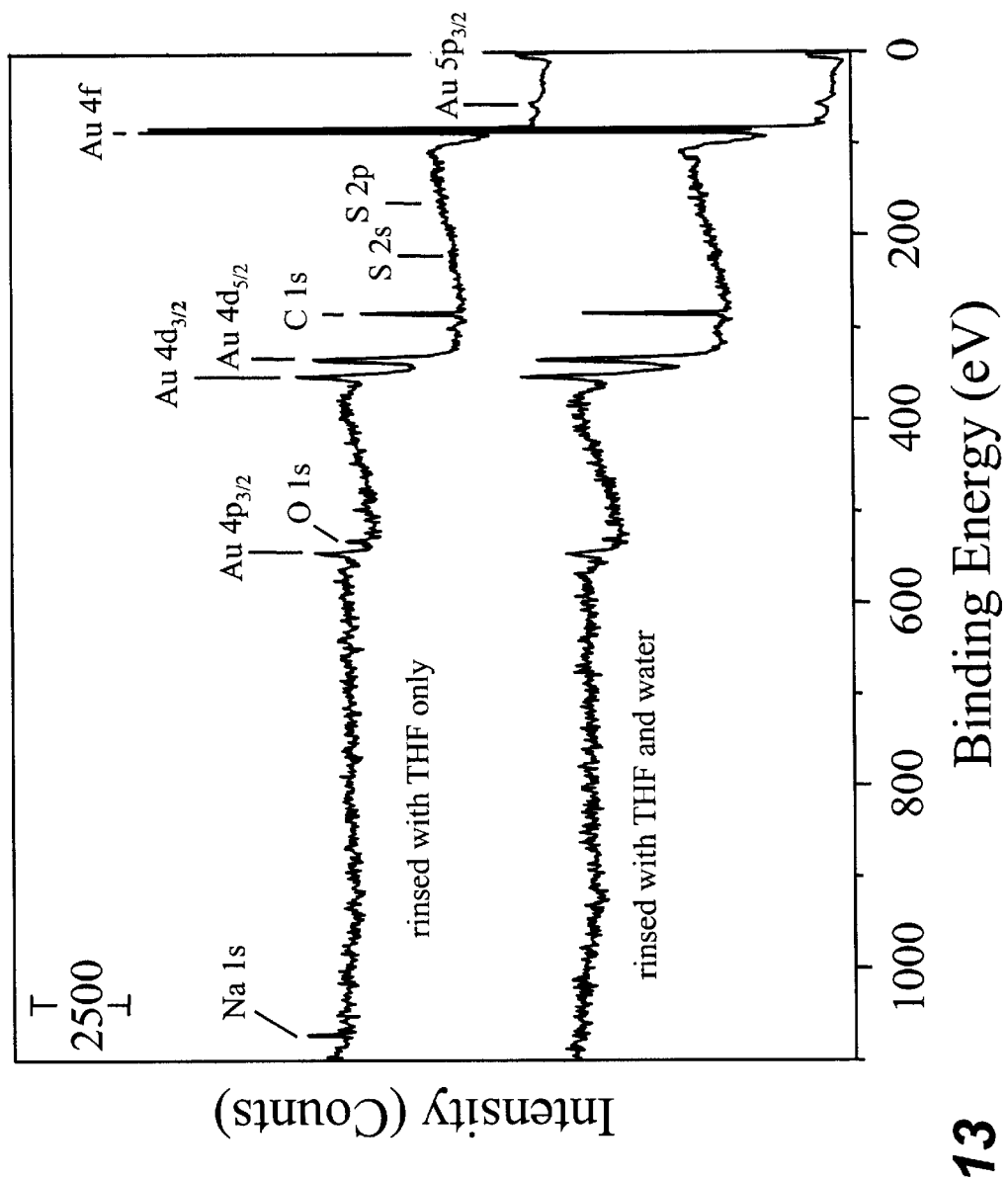
FIG. 13 depicts X-ray photoelectron survey spectra of SAMs formed by electro-chemisorption of n-hexadecylthiosulfate, and that had been washed with only THF or washed with THF and water.

Example 6
Mechanism of Monolayer Formation by Electrolysis at Gold Electrodes Our mechanistic hypothesis, summarized in FIG. 1, for the formation of SAMs in this way proposes the loss of $SO_3$ from the initially formed radical, followed by hydration to produce sulfuric acid. Because sulfate salts of sodium are only sparingly soluble in THF, one might expect precipitation at the electrode surface. To test this hypothesis, we analyzed the monolayer formed by oxidation of n-hexadecylthiosulfate both before and after rinsing with water, using x-ray photoelectron spectroscopy. The monolayers used in these studies were formed by electrolysis of n-hexadecylthiosulfate at 1.20 V using 5 pulses. After monolayer formation, one sample was rinsed with dry THF, and the other was rinsed with dry THF and then with water. The survey spectra (FIG. 13) of these two samples were similar, except for the photoemission due to Na (1 s) at 1072.0 eV and O (1 s) at 532.5 eV in the sample rinsed only with THF. The surface ratio of sodium: sulfur (as sulfate): oxygen is 1.5:1:4 based on high-resolution spectra (Au 4 $f_{7/2}$, C 1 s, O 1 s, and Na 1 s, and S 2p region) indicating a mixture of bisulfate and sulfate were produced during the electrolysis. [27] To minimize the influence of damage to the sample, these high-resolution spectra were collected from a different spot on the sample than where the survey spectrum and the C, S, and Au regional scans were obtained. The sulfur spectrum was collected twice so that this ratio came from the same spot.

Figure 14:
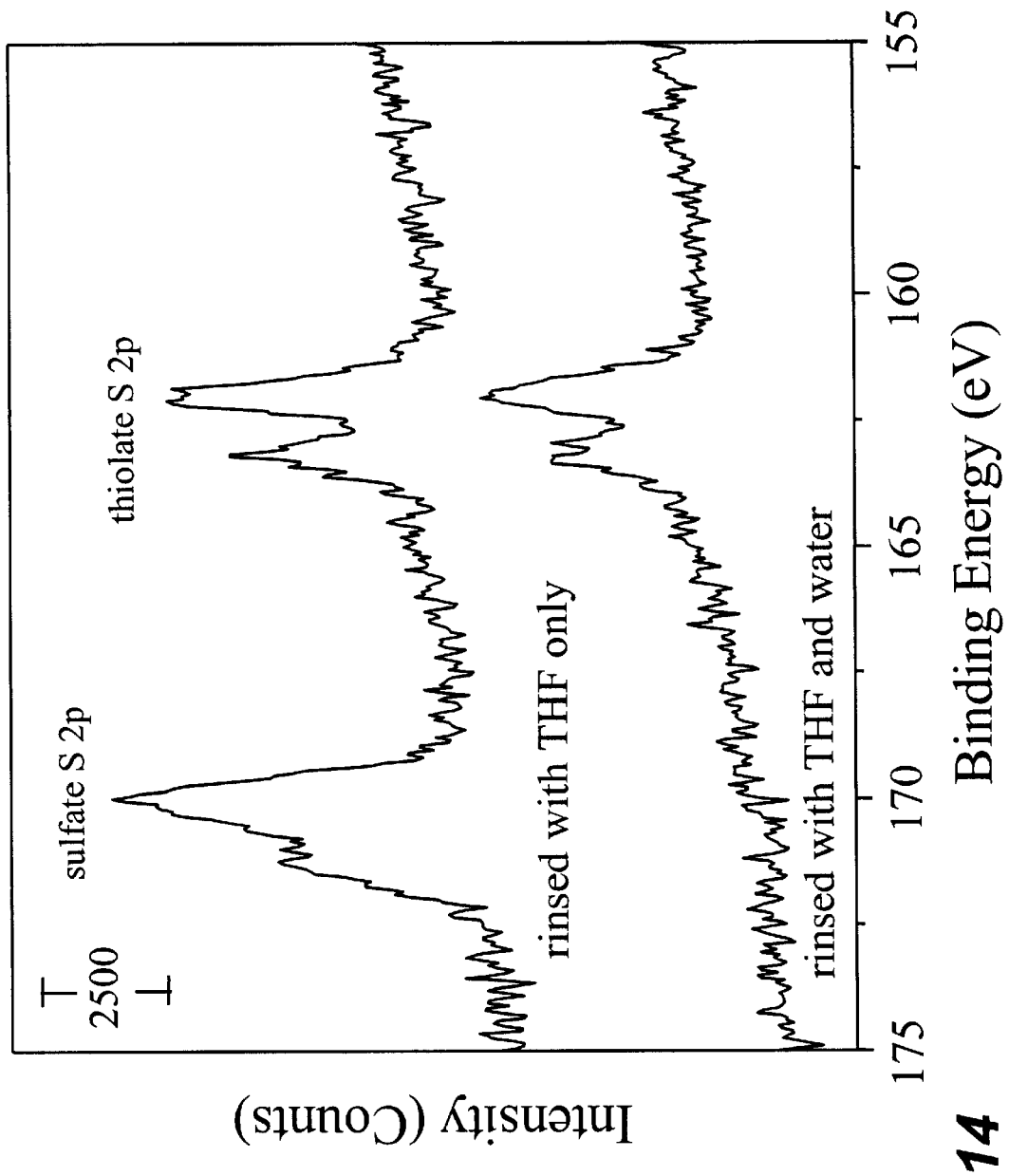
FIG. 14 shows high-resolution sulfur 2p x-ray photoelectron spectra of SAMs formed by electro-chemisorption of n-hexadecylthiosulfate, and washed with only THF or washed with THF and water.

High-resolution scans of the sulfur 2 p region (FIG. 14) revealed an additional difference: the sample rinsed only with THF contained two types of sulfur, a spin-orbit doublet at 162.0 and 163.1 eV due to the thiolate and an additional doublet at higher binding energy (170.0 and 171.3 eV) assigned to sulfate. [28] In contrast, the monolayer washed with THF and water contained photoemission from sulfur only as thiolate (162.0 and 163.2 eV). The ratio of Na:S (as sulfate): O in the monolayers rinsed with only THF suggested the formation of mixture of sodium sulfate and sodium bisulfate. These data are consistent with the proposed conversion of alkylthiosulfate to thiolate and sulfate, as summarized in FIG. 1.

Figure 15:
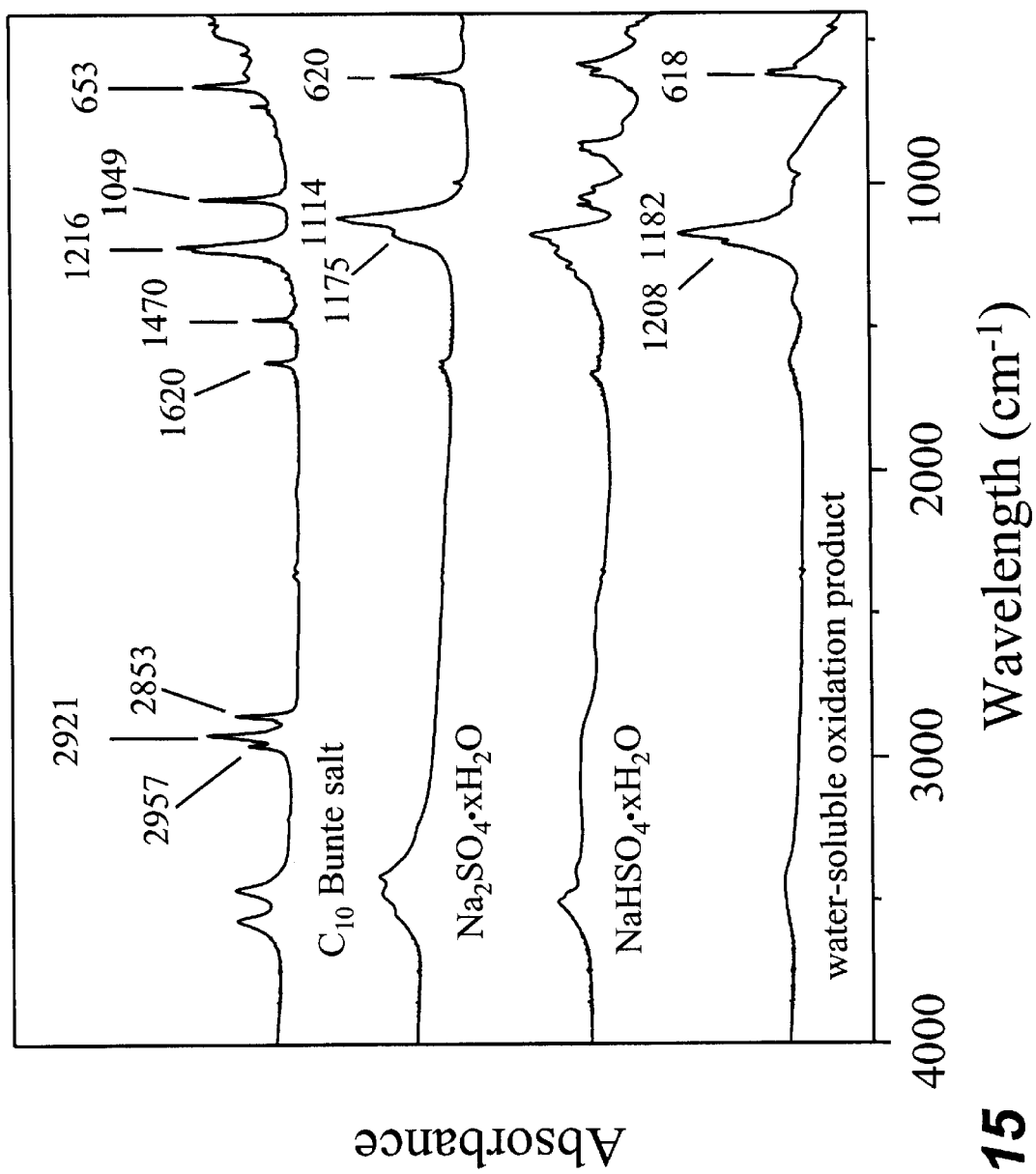
FIG. 15 is the infrared spectra of: (i) the aqueous extracts of product in bulk electrolysis of sodium n-hexadecylthiosulfate in THF; (ii) sodium sulfate; (iii) sodium bisulfate; and (iv) sodium n-decylthiosulfate.

Because sulfate is produced stoichiometrically in FIG. 1, we expected bulk electrolysis of n-hexadecylthiosulfate to produce a large amount of it. Indeed, 72 h of continuous pulses to 1.20 V were applied in 20 mL of a 30 mM n-hexadecylthiosulfate solution (0.3 M $Bu_4NBF_4$) in THF at a gold electrode. A white solid precipitated onto the electrode during the electrolysis. The solution was centrifuged and the precipitate collected, and an infrared spectrum of the crude solid indicated the presence of a mixture of $Bu_4NBF_4$, $Na_2SO_4$, and $NaHSO_4$. After extraction of the $Bu_4NBF_4$ with THF, the infrared spectrum of the purified solid (FIG. 15) indicated that the product was mainly $NaHSO_4$. [28]

Example 7
Advantages of this Electrochemical Synthesis of SAMs

One advantage of this electrochemical synthesis of SAMs is that clean gold is not required to form complete monolayers. To demonstrate this feature in dramatic way, two dirty gold electrodes were prepared by soaking in pump oil, followed by rinsing using hexanes and THF and drying with a stream of $N_2$. A good monolayer ($\theta_a$=44° for hexadecane) was obtained on one of these electrodes after 100 pulses to 1.10 V with n-tetradecylthiosulfate. In contrast, even 24 h of immersion in a 50-mM solution of hexadecanethiol in ethanol gave only an incomplete monolayer, with a 37° contact angle of hexadecane. These data suggest that the potential pulses either removed contamination from gold electrode or that the applied potential served to "drive" the alkylthiosulfate ion through the contamination and thereby displace it.

An even more important key advantage of this electrochemical synthesis over the conventional chemisorption of alkanethiols and -disulfides is that it provides selectivity in the placement of a SAM only on electrodes at potentials high enough to oxidize the thiosulfate precursor. We demonstrated this feature of the synthesis by selectively modifying one electrode in the close proximity of another. The samples used in these studies were triple-track testers [29], comprising a serpentine pattern of three 76-μm-wide gold lines spaced 76 μm apart on an alumina substrate. The two outer lines were connected at one end and electronically isolated to differentiate an inner electrode.

In order to make the electrochemical modifications on the triple-track tester, we first covered its leads using epoxy to avoid the interference from the leads that were made of iron. We calculated the theoretical pulsing time that was short enough to avoid the diffusion of the alkyl thiolate radicals generated from the working gold track during modification. We estimated the thickness of a diffusion layer according the following equation:

$$\Delta^2 = 2Dt$$

where $\Delta$ is the mean square displacement of the molecule, D is the diffusion coefficient (a typical value of D is $5 \times 10^{-5}$ cm$^2$/sec in aqueous solution), and t is time. [30] In order to make the diffusion layer thickness smaller than the distance between each track, 76 μm, the pulse sequence must be less than about 1 s according to the above equation. This theoretical prediction was examined experimentally as follows: the triple track tester was immersed into a 1 mM solution of $K_3Fe(CN)_6$ in water. Two of the triple tracks were monitored simultaneously by using the bi-potential function of the potentiostat. At the beginning, both tracks were held at 0.5 V so that no $Fe(CN)_6^{3-}$ would be reduced to $Fe(CN)_6^{4-}$. The potential of one track was then changed to 0 volt so that $Fe(CN)_6^{3-}$ near this track began to be reduced to $Fe(CN)_6^{4-}$ and could diffuse away from the track. After 1.1 s, we observed a spike from the other track due to the oxidation of $Fe(CN)_6^{4-}$ that had diffused from the other track. From this experiment, we learned that the experimental value matched the theoretical value quite well and defined how short our pulses had to be to avoid the diffusion layer to reach the neighboring electrode. However, we also recognized that the diffusion layer could be built up if continuous pulses were applied and the idle period was not short enough.

We started to modify our track by oxidizing n-dodecylthiosulfate salt with various pulse periods and checked the monolayer coverage by the blockage of redox of $Fe(CN)_6^{3-}/Fe(CN)_6^{4-}$. Contact angle measurements could not be applied on such a small surface, 76 μm in width, to provide information about the film quality. The literature contains reports that an ordered monolayer could effectively block the diffusion of $Fe(CN)_6^{3-}$ from the bulk solution by electron tunneling. [31] We saw very little blockage of the redox of $Fe(CN)_6^{3-}/Fe(CN)_6^{4-}$ on the track after even several hundred 0.01- and 0.05-s pulses. The monolayer gave only partial blockage on the track after 150 cycles of 0.1 s pulse sequences. Finally, 0.2 s pulses gave satisfactory results.

To demonstrate selectivity in this process, a triple-tracks-tester was then immersed into a 10 mM solution of sodium n-dodecylthiosulfate (THF, 0.1 M Bu$_4$NBF$_4$), and the potential of the central electrode was stepped from −0.90 V (vs. Ag/AgNO$_3$) to +0.90 V. It was held at this potential for 200 ms and then stepped back to the 0.90 V resting potential. This process was repeated through 150 pulses, with a 6-s interval between pulses; the outer electrode was electronically isolated throughout this process. The differences between this protocol and that used to form the SAMs of n-hexadecylthiosulfate reflect optimization to minimize cross-contamination of the nearby electrode in this experiment, as well as the difference in the chain lengths ($C_{12}$ vs. $C_{16}$) of the precursors.

Figure 16:
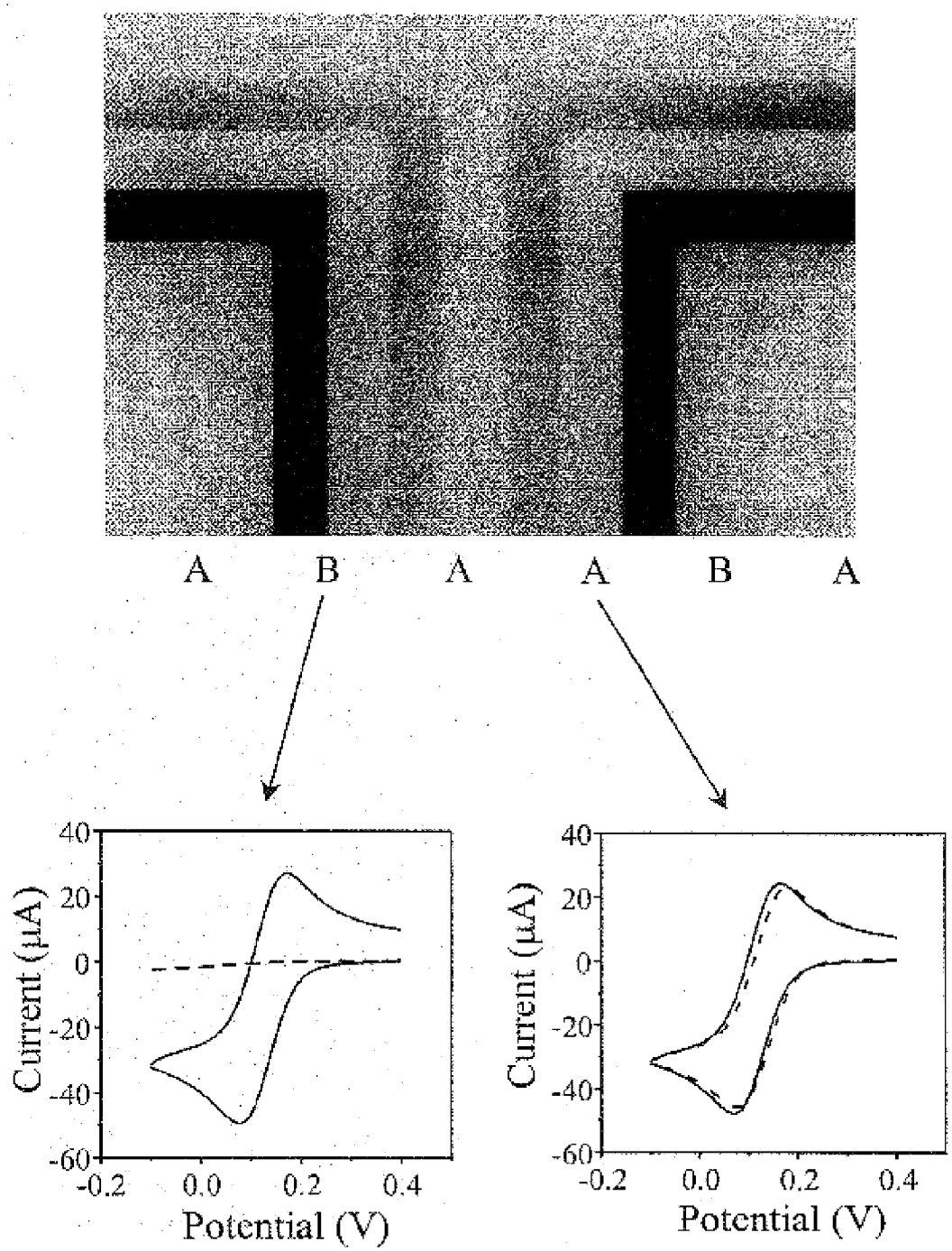
FIG. 16 is a fluorescence micrograph (100× magnification) of a triple-track tester covered with a thin film of an aqueous solution of the fluorescent dye, rhodamine-6G (1.06-mM). The central electrode has been modified by 150 pulses to 0.90 V (vs. Ag/$AgNO_3$) in a 10 mM solution of sodium n-dodecylthiosulfate in THF (0.1 M $Bu_4NBF_4$) and is hydrophobic and dewetted by the dye solution. The outer electrode (two outer conducting lines) is unmodified and covered by the dye solution. Both the widths of the gold lines and the spacings between them were in the range of 70–80 μm. The cyclic voltammograms (1.0 mM $K_3Fe(CN)_6$, 0.1 M KCl, 100 mV/s) beneath the micrograph show the voltametric responses of both electrodes before (solid lines) and after (dashed lines) modification of the inner electrode.

This process left the two electrodes on the device strongly differentiated, both in surface energy and electrochemical activity. FIG. 16 shows a fluorescence micrograph (100× magnification) of the device coated with a thin layer of a 1.06-mM aqueous solution of the fluorescent dye, rhodamine-6G. A few drops of the dye solution (1.06 mM) were spread evenly over all of the conducting tracks. Excess solution was then removed, causing the dewetting evident in the micrograph. The fluorescence micrographs were obtained using a Nikon Microflex UFX-II microscope, equipped with a Nikon FX35a camera, at a magnification of 100×.

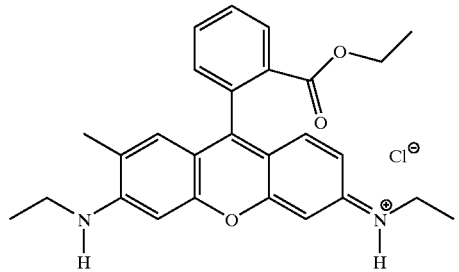

Blue excitation light B2A OM 510
450~490 nm main 480 nm
520~700 nm
Green excitation light G2A DM 580
510~560 nm main 546 nm
590~700 nm The modified (central) electrode repels the solution and thus appears black due to the absence of the dye. The unmodified (outer) electrode is coated with the dye solution and thus appears greenish-yellow. Below the micrograph in FIG. 16 are cyclic voltammograms for a second triple-track tester immersed in aqueous solution of ferricyanide, before and after electrode modification. The modified electrode B showed a normal response prior to modification but was electrochemically inactive after coating with a dodecanethiolate monolayer. In contrast, the response of the unmodified electrode A at this scan rate did not change significantly before and after treatment of electrode B.

REFERENCES CITED HEREIN

The following references are incorporated by reference herein in their entirety, including any drawings.

1. Nuzzo, R. G.; Allara, D. L. *J. Am. Chem. Soc.* 1983, 105, 448.
2. Bain C. D.; Troughton, E. B.; Tao, Y.-T.; Evall, J.; Whitesides, G. M.; Nuzzo, R. G. *J. Am. Chem. Soc.* 1989, 111, 321–335.
3. Ulman, A. *Chem. Rev.* 1996, 96, 1533.
4. (a) Abe, K.; Takiguchi, H.; Tamada, K. *Langmuir* 2000, 16, 2394. (b) Abbott, S.; Ralston, J.; Reynolds, G.; Hayes, R. *Langmuir* 1999, 15, 8923. (c) Graupe, M.; Koini, T.; Kim, H. I.; Garg, N.; Miura, Y. F.; Takenaga, M.; Perry, S. S.; Lee, T. R. *Colloids Surf.*, A 1999, 154, 239. (d) Miura, Y. F.; Takenaga, M.; Koini, T.; Graupe, M.; Garg, N.; Graham, R. L. Jr.; Lee, T. R. *Langmuir* 1998, 14, 5821. (e) Engquist, I.; Liedberg, B. *J. Phys. Chem.* 1996, 100, 20089. (f) Ulman, A. *Thin Solid Films* 1996, 273, 48. (g) Drelich, J.; Miller, J. D.; Good, R. J. *J. Colloid Interface Sci.* 1996, 179, 37. (h) Lee, T. R.; Carey, R. I.; Biebuyck, H. A.; Whitesides, G. M. *Langmuir* 1994, 10, 741. (i) Laibinis, P. E.; Whitesides, G. M. *J. Am. Chem. Soc.* 1992, 114, 1990. (j) Laibinis, P. E.; Fox, M. A.; Folkers, J. P.; Whitesides, G. M. *Langmuir* 1991, 7, 3167. (k) Bain, C. D.; Whitesides, G. M. *J. Am. Chem. Soc.* 1989, 111, 7164.

5. (a) Quon, R. A.; Ulman, A.; Vanderlick, T. K. *Langmuir* 2000, 16, 8912. (b) Callow, M. E.; Callow, J. A.; Ista, L. K.; Coleman, S. E.; Nolasco, A. C.; Lopez, G. P. *Appl. Environ. Microbiol.* 2000, 66, 3249. (c) Clear, Susannah C.; Nealey, Paul F. *J. Colloid Interface Sci.* 1999, 213, 238. (d) Glodde, M.; Hartwig, A.; Hennemann, O.-D.; Stohrer, W.-D. *Int. J Adhes. Adhes.* 1998, 18, 359. (e) Zhuk, A. V.; Evans, A. G.; Hutchinson, J. W.; Whitesides, G. M. *J. Mater. Res.* 1998, 13, 3555. (f) Opila, R. L.; Legrange, J. D.; Markham, J. L.; Heyer, G.; Schroeder, C. M. *J. Adhes. Sci. Technol.* 1997, 11, 1. (g) Silin, V.; Weetall, H. *Proc. Annu. Meet. Adhes. Soc.* 1996, 19, 211. (h) Wiencek, K. M.; Fletcher, M. *J. Bacteriol.* 1995, 177, 1959.

6. (a) Schoenfisch, M. H.; Ovadia, M.; Pemberton, J. E. *J. Biomed. Mater. Res.* 2000, 51, 209. (b) Bruening, M. L.; Zhou, Y.; Aguilar, G.; Agee, R.; Bergbreiter, D. E.; Crooks, R. M. *Langmuir* 1997, 13, 770. (c) Rudolph, A. S. *J. Cell Biochem.* 1994, 56, 183.

7. (a) Retna, R. C.; Ohsaka, T. *Bioelectrochem.* 2001, 53, 251. (b) Grunze, M. *Proc. Annu. Meet. Adhes. Soc.* 2000, 23, 4. (c) Wiencek, K. M.; Fletcher, M. *Biofouling* 1997, 11, 293. (d) Ista, L. K.; Fan, H.; Baca, O.; Lopez, G. P. *FEMS Microbiol. Lett.* 1996, 142, 59. (e) Lindner, E. *Biofouling* 1992, 6, 193. (f) Whitesides, G. M.; Ferguson, G. S.; Allara, D.; Scherson, D.; Speaker, L.; Ulnan, A. *Rev. Surf. Chem.* 1993,3,49.

8. (a) Emberly, E.; Kirczenow, G. *J. Appl. Phys.* 2000, 88, 5280. (b) Forzani, E. S.; Solis, V. M.; Calvo, E. *J. Anal. Chem.* 2000, 72, 5300. (c) Deng, W.; Fujita, D.; Yang, L.; Nejo, H.; Bai, C. *Jpn. J. Appl. Phys. Part 2*, 2000, 39, L751. (d) Berlin, A.; Zofti, G. *Macromol. Rapid Commun.* 2000, 21, 301. (e) Cheng, Y.; Corn, R. M. *J. Phys. Chem. B.* 1999, 103, 8726. (f) Nishimura, N.; Ooi, M.; Shimazu, K.; Fujii, H.; Uosaki, K. *J. Electroanal. Chem.* 1999, 473, 75. (g) Reinerth, W. A.; Jones, L., II; Burgin, T. P.; Zhou, C.-w.; Muller, C. J.; Deshpande, M. R.; Reed, M. A.; Tour, J. M. *Nanotechnology* 1998, 9, 246. (h) Nakanishi, T.; Ohtani, B.; Uosaki, K. *J. Phys. Chem. B* 1998, 102, 1571. (i) Kaifer, A. E. *Prog. Colloid Polym. Sci.* 1997, 103, 193. (j) Clark, S. L.; Montague, M.; Hammond, P. T. *Supramol. Sci.* 1997, 4, 141. (k) Lee, Y. J.; Jeon, I. C.; Paik, W.-k.; Kim, K. *Langmuir* 1996, 12, 5830. (l) Davis, F.; Stirling, C. J. M. *J. Am. Chem. Soc.* 1995, 117, 10385. (m) Tour, J. M.; Jones, L. II; Pearson, D. L.; Lamba, J. J. S.; Burgin, T. P.; Whitesides, G. M.; Allara, D. L.; Parikh, A. N.; Atre, S. *J. Am. Chem. Soc.* 1995, 117, 9529. (n) Bell, C. M.; Yang, H. C.; Mallouk, T. E. *Adv. Chem. Ser.* 1995, 245, 211. (o) Evans, S. D.; Freeman, T. L.; Flynn, T. M.; Batchelder, D. N.; Ulman, A. *Thin Solid Films* 1994, 244, 778. (p) Schneider, T. W.; Buttry, D. A. *J. Am. Chem. Soc.* 1993, 115, 12391. (q) Spinke, J.; Liley, M.; Guder, H. J.; Angermaier, L.; Knoll, W. *Langmuir* 1993, 9, 1821. (r) Thomas, R. C.; Sun, L.; Crooks, R. M.; Ricco, A. J. *Langmuir* 1991, 7, 620.

9. (a) Gaspar, S.; Zimmermann, H.; Gazaryan, I.; Csoregi, E.; Schuhmann, W. *Electroanalysis*, 2001, 13, 284 (b) Ferretti, S.; Paynter, S.; Russell, D. A.; Sapsford, K. E.; Richardson, D. J. *Trends Anal. Chem.* 2000, 19, 530. (c) Yang, S.; Perez-Luna, V. H.; Lopez, G. P. *Proc. SPIE-Int. Soc. Opt. Eng.* 2000, 3926, 181. (d) Chen, C. S.; Ostuni, E.; Whitesides, G. M.; Ingber, D. E. *Methods Mol. Biol.* 2000, 139, 209. (e) Alexander, P. W.; Rechnitz, G. A. *Electroanalysis* 2000, 12, 343. (f) Nyquist, R. M.; Eberhardt, A. S.; Silks, L. A., III; Li, Z.; Yang, X.; Swanson, B. I. *Langmuir* 2000, 16, 1793. (g) Everhart, D. S. *Chemtech* 1999, 29, 30. (h) Liedberg, B; Cooper, J. M. in *Immobilized Biomolecules in Analysis*; Cass, T.; Ligler, F. S. Ed.; Oxford University Press. 1998, p55–78. (i) Cotton, C.; Glidle, A.; Beamson, G.; Cooper, J. M. *Langmuir* 1998, 14, 5139. (j) Gooding, J. J.; Praig, V.; Hall, E. A. H. *Anal. Chem.* 1998, 70, 2396. (k) Chen, C. S.; Mrksich, M.; Huang, S.; Whitesides, George M.; Ingber, D. E. *Biotechnol. Prog.* 1998, 14, 356. (l) Tender, L. M.; Opperman, K. A.; Hampton, P. D.; Lopez, G. P. *Adv. Mater.* 1998, 10, 73 (m) Sampath, S.; Lev, O. *Adv. Mater.* 1997, 9, 410–413, and references therein.

10. (a) Collinson, M.; Bowden, E. F.; Tarlov, M. J. *Langmuir* 1992, 8, 1247. (b) Willner, I.; Katz, E.; Riklin, R.; Kasher, R. *J. Am. Chem. Soc.* 1992, 114, 10967.

11. (a) Chan, K. C.; Kim, T.; Schoer, J. K.; Crooks, R. M. *J. Am. Chem. Soc.* 1995, 117, 5875. (b) Kumar, A.; Whitesides, G. M. *Appl. Phys. Letter* 1993, 163, 2002. (c) Wilber, J. L.; Kim, E.; Xia, Y.; Whitesides, G. M. *Adv. Mater.* 1995, 7, 649. (d) Tarlov, M. J.; Burgess, D. R. F., Jr.; Gillen, G. *J. Am. Chem. Soc.* 1993, 115, 5305. (e) Gorman, C. B.; Biebuyck, H. A.; Whitesides, G. M. *Chem. Mater.* 1995, 7, 526. (f) Gardner, T. J.; Frisbie, C. D.; Wrighton, M. S. *J. Am. Chem. Soc.* 1995, 117, 6927. (g) Tao, Y.-T.; Kannaiyan, P.; Lee, W.-C. *Langmuir* 1998, 14, 6158. (h) Xia, Y.; Zhau, X.-M.; Whitesides, G. M. *Microelectronic Engineering* 1996, 32, 255. (i) Wilbur, J. L.; Biebuyck, H. A.; MacDonald, J. C.; Whitesides, G. M. *Langmuir* 1995, 11, 827. (j) Bar, G.; Rubin, S.; Parikh, A. N.; Swanson, B. I.; Zawodzinski, T. A.; Whangbo, M. H. *Langmuir* 1997, 13, 373. (k) Bar, G.; Rubin, S.; Taylor, T. N.; Swanson, B. I.; Zawodzinski, T. A.; Chow, J. T.; Ferraris, J. P. *J. Vac. Sci. Technol., A* 1996, 14, 1794. (l) Hayes, W. A.; Kim, H.; Yue, X.; Perry, S. S.; Shannon, C. *Langmuir* 1997, 13, 2511.

12. For examples, see: (a) Kumar, A.; Whitesides, G. M. *Appl. Phys. Lett.* 1993, 63, 2002. (b) Kumar, A.; Biebuyck, H.; Whitesides, G. M. *Langmuir* 1994, 10, 1498. (c) Xia, Y.; Kim, E.; Whitesides, G. M. *J. Electrochem. Soc.* 1996, 143, 1070. (d) Xia, Y.; Zhao, X.-M.; Whitesides G. M. *Microelectron. Eng.* 1996, 32, 255.

13. (a) Weisshaar, D. E.; Lamp, B. D.; Porter, M. D. *J. Am. Chem. Soc.* 1992, 114, 5860. (b) Tender, R. L.; Worley, H.; Fan, H.; Lopez, G. P. *Langmuir* 1996, 12, 5515. (c) Riepl, M.; Mirsky, V. M.; Wolfbeis, O. S. *Mikrochim. Acta* 1999, 131, 29.

14. (a) Widrig, C. A.; Chung, C.; Porter, M. D. *J. Electroanal. Chem.* 1991, 310, 335. (b) Walczak, M. M.; Popenoe, D. D.; Deihammer, R. S.; Lamp, B. D.; Chung, C.; Porter, M. D. *Langmuir* 1991, 7, 2687. (c) Walczak, C. A.; ALves, C. A.; Lamp, B. D. *J. Electroanal. Chem.* 1995, 396, 103 (d) Zhong, C.-J.; Porter, M. D.; *J. Am. Chem. Soc.* 1994, 116, 11616. (e) Hobara, D.; Ota, M.; Imabayashi, S.-i. Niki, K.; Kakiuchi, T. *J. Electroanal. Chem.* 1998, 444, 113. (f) Nishizawa, M.; Sunagawa, T.; Yoneyama, H.; Suita, Y.-o., *J. Electroanal. Chem.* 1997, 436, 213. (f) Wittstock, R.; Hesse, R.; Schuhmann, W. *Electroanalysis* 1997, 9, 746. (g) Tender, L. M. Opperman, K. A.; Hampton, P. D.; Lopez, *Adv. Mater.* 1998, 10, 73. (h) Imabayashi, S.-i.; Hobara, D.; Kakiuchi, T. *Langmuir* 2001, 17, 2560. (i) Sawaguchi, T.; Sato, Y.;

Mizutani, F. *J. Electroanal. Chem.* 2001, 496, 50. (j) Kakiuchi, T.; Iida, M.; Gon, N.; Hobara, D.; Imabayashi, S.-i.; Niki, K. *Langmuir* 2001, 17, 1599. (k) Esplandiu, M. J.; Hagenstroem, H.; Kolb, D. M. *Langmuir* 2001, 17, 828. (l) Kawaguchi, T.; Yasuda, H.; Shimazu, K.; Porter, Marc D. *Langmuir* 2000, 16, 9830. (m) Kakiuchi, T.; Sato, K.; Iida, M.; Hobara, D. Imabayashi, S.-i.; Niki, K. *Langmuir* 2000, 16, 7238. (n) Wong, Sze-Shun; Porter, M. D. *J. Electroanal. Chem.* 2000, 485, 135. (o) Hobara, D.; Ueda, K.; Imabayashi, S.-I.; Yamamoto, M.; Kakiuchi, T. *Electrochem.* 1999, 67, 1218. (p) Byloos, M.; Al-Maznai, H.; Morin, M. *J. Phys. Chem. B* 1999, 103, 6554. (q) Kondo, T.; Yanagida, M.; Shimazu, K.; Uosaki, K. *Langmuir* 1998, 14, 5656. (r) Aoki, K.; Kakiuchi, T. *J. Electroanal. Chem.* 1998, 452, 187. (s) Hobara, D.; Miyake, K.; Imabayashi, S.-i.; Niki, K.; Kakiuchi, T. *Langmuir* 1998, 14, 3590. (t) Szafranski, C. A.; Tanner, W.; Laibinis, P. E.; Garrell, R. L. *Langmuir* 1998, 14, 3570. (u) Yang, D.-F.; Morin, M. *J. Electroanal. Chem.* 1998, 441, 173. (v) Sato, Y.; Mizutani, F.; Tsukuba, H., *J. Electroanal. Chem.* 1997, 438, 99. (w) Arnold, S.; Feng, Z. Q.; Kakiuchi, T.; Knoll, W.; Niki, K. *J. Electroanal. Chem.* 1997, 438, 91. (x) Imabayashi, S.-i.; Hobara, D.; Kakiuchi, T.; Knoll, W. *Langmuir* 1997, 13, 4502. (y) Yang, D.-F.; Morin, M *J. Electroanal. Chem.* 1997, 429, 1. (z) Imabayashi, S.-i.; lida, M.; Hobara, D.; Feng, Z. Q.; Niki, K.; Kakiuchi, T. *J Electroanal. Chem.* 1997, 428, 33. (aa) Zhong, C.-J.; Zak, J.; Porter, M. D. *J. Electroanal. Chem.* 1997, 421, 9. (bb) Yang, D.-F.; Al-Maznai, H.; Morin, M. *J. Phys. Chem. B* 1997,101, 1158. (cc) Yang, D.-F.; Wilde, C. P.; Morin, M. *Langmuir* 1997, 13, 243. (dd) McCarley, T. D.; McCarley, R. L. *Anal. Chem.* 1997, 69, 130. (ee) Kwan, W. S. V.; Penneau, J. F.; Miller, L. L. *J. Electroanal. Chem. Interfacial Electrochem.* 1990, 291, 295. 15. (a) Affleck, J. G.; Doughatry, G. *J. Org. Chem.* 1950,15, 865. (b) Milligan, B. L.; Swan, L. M. *J. Chem. Soc.* 1962, 2172.

16. H. Bunte, *Chem. Ber*, 1874, 7, 646.
17. (a) Westlake, H. E. Jr., Dougherty, G. *J. Am. Chem. Soc.* 1941, 63, 658. (b) Weiss, U.; Sokol, A. *J. Am. Chem. Soc.* 1942, 64, 149. (c) Weiss, U.; Sokol, A. *J. Am. Chem. Soc.* 1950, 72, 1687. (d) Distler, H. *Angew. Chem. Internat. Eng.* 1967, 6, 544. (e) J. L. Kice, *J. Org. Chem.*, 1963, 28, 957.
18. (a) Alonso, M. E.; Aragona, H. *Org. Synth.* 1978, 58, 147. (b) Price, T. S.; Twiss, D. F., *J. Chem. Soc.* 1908, 1395. (c) Price, T. S.; Twiss, D. F., *J. Chem. Soc.* 1908, 1401.
19. Price, T. S.; Twiss, D. F., *J. Chem. Soc.* 1907, 2021.
20. Czerwinski, A.; Orzeszko, A.; Kazimierczuk, Z.; Marassi, R.; Zamponi, S. *Anal. Lett.* 1997, 30, 2391.
21. (a) Orzeszko, A.; Czerwinski, A.; Kazimierczuk, Z. *J. Polym. Mater.* 1997, 11, 21. (b) Orzeszko, A. *J. Polym. Mater.* 1994, 11, 69.
22. Ulman, A. *An Introduction to Ultrathin Organic Films from Langmuir-Blodgett to Self-Assembly*, Academic Press, New York, 1991.
23. Lee, M.-T.; Hsueh, C.-C.; Freund, M. S.; Ferguson, G. S. *Angew. Chem. Int. Eng.* 2000, 39, 1228.
24. Miller, C.; Curndet, P.; Grätzel, M. *J. Phys. Chem.* 1991, 95, 877.
25. For recent examples, see: (a) Scott, J. R.; Baker, L. S.; Everett, W. R.; Wilkins, C. L.; Fritsch, I. *Anal. Chem.* 1997, 69, 2636. (b) Zhang, Y.; Terrill, R. H.; Tanzer, T. A.; Born, P. W. *J. Am. Chem. Soc.* 1998, 120, 2654. (c) Norrod K. L.; Rowlen, K. L. *J. Am. Chem. Soc.* 1998, 120, 2656. (d) Schoenfisch M. H.; Pemberton, J. E. *J. Am. Chem. Soc.* 1998, 120, 4502. (e) Lee, M.-T.; Hsueh, C.-C.; Freund, M. S.; Ferguson, G. S. *Langmuir* 1998, 22, 6419.
26. Lukkari, J.; Meretoja, M.; Kartio, I.; Laajalehto, K.; Rajamaeki, M.; Lindstroem, M.; Kankare, J. *Langmuir* 1999, 10, 3529.
27. (a) Audi, A. A.; Sherwood, P. M. A. *Surf. Interface Anal.* 2000, 29, 265. (b) Olsson, C-O. A.; Agarwal, P.; Frey, M.; Landolt, D. *Corros. Sci.* 2000, 42, 1197. (c) Ardizzone, S.; Bianchi, C. L. *Appl. Surf. Sci.* 1999, 152, 63. (d) Engström, P.; Ambernstsson, A.; Skoglundh, M.; Fridell, E.; Smedler, G. *Appl. Catal., B* 1999, 22, 35.
28. For an infrared spectrum of $NaHSO_4$, see Baran, J.; Ilczyszyn, M. M.; Marchewka, M. K.; Ratajczak, H. *Spectrosc. Lett.* 1999, 32, 83. For an infrared of $Na_2SO_4$, see (a) Davies, J. E. D.; Sandford, W. F. *J. Chem. Soc., Dalton Trans.* 1975, 19, 1912. (b) Durie, R. A.; Milne, J. W. *Spectrochim. Acta, Part A,* 1978, 34A, 215.
29. (a) Mancke, R. G. *IEEE Trans. Comp. Hybr. Manuf. Techn.,* 1981, CHMT-4, 492. (b) Fabianowski, W.; Jaccodine, R.; Kodnani, R.; Pearson, R.; Smektala, P. *Adv. Mater. Opt. Electron.* 1995, 5, 199.
30. Bard, A. J.; Faulkner, L. R. *Electrochemical Methods Fundamentals and Applications*, John Wiley & Son, New York, 1980.
31. Chailapakul, O.; Sun, L.; Xu, C.; Crooks, R. M. *J. Am. Chem. Soc.* 1993, 115, 12459.
32. (a) Freund M. S.; Lewis, N. S. *Proc. Natl. Acad. Sci.* 1995, 92, 2652. (b) Hseuh, C.-C.; Liu, Y.; Henry, M.; Freund, M. S. *Anal. Chim. Acta,* 1999, 397, 135.
33. (a) Ricco, A. J.; Crooks, R. M.; Osbourn, G. *Acc. Chem. Res.* 1998, 31, 289. (b) Crooks, R. M.; Ricco, A. J. *Acc. Chem. Res.* 1998, 31, 219.
34. Goss, C.A.; Charych, D. H.; Majda, M. *Anal. Chem.* 1991, 63, 85.
35. Scofield, J. H. *J. Electron. Spectrosc.* 1976, 8, 129.
36. Scienta ESCA300 Users' Manual; Scienta: Uppsala, Sweden, 1997.
37. Beamson, G.; Briggs, D. *High Resolution APS of Organic Polymers*; The Scienta ESCA300 Database; Wiley: New York, 1992.

Conclusion

Thus, those of skill in the art will appreciate that the methods and uses herein provide a novel, selective, easy, and economical way of producing monolayers on metal surfaces.

One skilled in the art will appreciate that these methods and devices are and may be adapted to carry out the objects and obtain the ends and advantages mentioned, as well as those inherent therein. The methods and procedures described herein are presently representative of preferred embodiments and are exemplary and are not intended as limitations on the scope of the invention. Changes therein and other uses will occur to those skilled in the art which are encompassed within the spirit of the invention and are defined by the scope of the disclosure.

It will be apparent to one skilled in the art that varying substitutions and modifications may be made to the invention disclosed herein without departing from the scope and spirit of the invention.

Those skilled in the art recognize that the aspects and embodiments of the invention set forth herein may be practiced separate from each other or in conjunction with each other. Therefore, combinations of separate embodiments are within the scope of the invention as disclosed herein.

All patents and publications mentioned in the specification are indicative of the levels of those skilled in the art to which the invention pertains. All patents and publications are herein incorporated by reference to the same extent as if each individual publication was specifically and individually indicated to be incorporated by reference.

The invention illustratively described herein suitably may be practiced in the absence of any element or elements, limitation or limitations which is not specifically disclosed herein. Thus, for example, in each instance herein any of the terms "comprising", "consisting essentially of" and "consisting of" may be replaced with either of the other two terms. The terms and expressions which have been employed are used as terms of description and not of limitation, and there is no intention that in the use of such terms and expressions indicates the exclusion of equivalents of the features shown and described or portions thereof. It is recognized that various modifications are possible within the scope of the invention disclosed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the disclosure.

In addition, where features or aspects of the invention are described in terms of Markush groups, those skilled in the art will recognize that the invention is also thereby described in terms of any individual member or subgroup of members of the Markush group. For example, if X is described as selected from the group consisting of bromine, chlorine, and iodine, disclosure for X being bromine and disclosure for X being bromine and chlorine are fully described.

What is claimed is:

1. A method of preparing self-assembled organic monolayers on a metal comprising
   (a) contacting said metal with a solution comprising an organic thiosulfate compound, and
   (b) electrolyzing said organic thiosulfate compound by applying on said metal sufficiently high anodic potential for sufficient time to result in the oxidative self-assembly of said monolayers on said metal.

2. The method of claim 1, wherein said metal is selected from the group consisting of gold, silver, mercury, and copper.

3. The method of claim 2, wherein said metal is gold.

4. The method of claim 1, wherein said potential is either constant or variable.

5. The method of claim 1, wherein said thiosulfate compound has the formula R—S—SO$_3$M, wherein
   R is selected from the group consisting of hydrogen, branched chain or straight chain alkyl, cycloalkyl, cycloalkenyl, heterocycle, aromatic ring, and heteroaromatic ring, each of which may be optionally substituted; and
   M is a counterion.

6. The method of claim 5, wherein said R is a straight chain alkyl and said thiosulfate has the formula CH$_3$(CH$_2$)$_n$SSO$_3$M, wherein n is between 0 and 50.

7. The method of claim 6, wherein n is between 7 and 15.

8. The method of claim 6, wherein n is selected from the group consisting of 7, 9, 11, 13, and 15.

9. The method of claim 5, wherein M is a metal ion.

10. The method of claim 9, wherein said metal ion is an alkali metal ion, selected from the group consisting of lithium ion, sodium ion, potassium ion, and cesium ion.

11. The method of claim 1, wherein said solution comprises a solvent that comprises a polar compound.

12. The method of claim 11, wherein said polar compound is selected from the group consisting of water, acetonitrile, methanol, ethanol, isopropanol, dimethylether, diethylether, tetrahydrofuran, dimethylsulfoxide, acetone, dimethylformamide, and methylene chloride.

13. The method of claim 1 further comprising adding a salt to the solvent.

14. The method of claim 13, wherein said salt comprises a halogen.

15. The method of claim 14, wherein said salt is selected from the group consisting of a salt of a perhalate, tetraalkylammonium tetrahaloborate, tetraalkylammonium hexahalophosphate, and tetraalkylammonium perhalate.

16. The method of claim 15, wherein said salt is selected from the group consisting of lithium perchlorate, tetrabutylammonium tetrafluoroborate, tetrabutylammonium hexafluorophosphate, and tetrabutylammonium perchlorate.

17. The method of claim 1, wherein said potential is applied cyclically.

18. The method of claim 17, wherein said potential is between −1 and +2 volts.

19. The method of claim 17, wherein said potential is between −0.9 and +1.6 volts.

20. The method of claim 17, wherein said potential is between −0.9 and +1.2 volts.

21. The method of claim 17, wherein said potential is applied for at least 5 cycles.

22. The method of claim 17, wherein said potential is applied for at least 1 cycle.

23. The method of claim 1, wherein said potential is applied as a series of pulses.

24. The method of claim 23, wherein said series of pulses comprises at least 150 pulses.

25. The method of claim 23, wherein said series of pulses comprises at least 5 pulses.

26. The method of claim 23, wherein said series of pulses comprises at least 1 pulse.

27. The method of claim 23, wherein said pulses are applied as increments of 0.1 V in the range of −0.6 V to +1.6 V.

28. The method of claim 23, wherein said potential at each step is held for at least 200 ms.

29. A method for the selective formation of self-assembled organic monolayers on a first metal electrode in the vicinity of a second metal electrode, comprising
   (a) contacting said metal electrodes with a solution comprising an organic thiosulfate compound under conditions such that chemisorption of said organic thiosulfate compound onto said first and second electrodes does not occur, and
   (b) electrolyzing said organic thiosulfate compound by selectively applying on said first metal electrode sufficiently high anodic potential for sufficient time to result in the oxidative self-assembly of said organic monolayers on said first electrode.

* * * * *

UNITED STATES PATENT AND TRADEMARK OFFICE
CERTIFICATE OF CORRECTION

PATENT NO.       : 6,818,117 B2                                Page 1 of 1
APPLICATION NO. : 10/094759
DATED            : November 16, 2004
INVENTOR(S)      : Ferguson et al.

It is certified that error appears in the above-identified patent and that said Letters Patent is hereby corrected as shown below:

<u>Title page,</u>
Item [56], References Cited, OTHER PUBLICATIONS,
"G.M. Whitesides" reference, after "G.S." delete "," and insert -- ; --.
"1st G. Bar" reference, after "T.A." delete "," and insert -- ; --.
"M.L. Bruening" reference, delete "hydrophibic," and insert -- hydrophobic --.

Signed and Sealed this

Twentieth Day of June, 2006

JON W. DUDAS
*Director of the United States Patent and Trademark Office*